(12) United States Patent
Hirase et al.

(10) Patent No.: US 6,308,195 B1
(45) Date of Patent: Oct. 23, 2001

(54) 4-2 COMPRESSOR CIRCUIT AND VOLTAGE HOLDING CIRCUIT FOR USE IN 4-2 COMPRESSOR CIRCUIT

(75) Inventors: Yuko Hirase; Katsunori Sawai, both of Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/248,284

(22) Filed: Feb. 11, 1999

(30) Foreign Application Priority Data

Aug. 10, 1998 (JP) ................................. 10-226144

(51) Int. Cl.[7] .............................. G06F 7/50; G06F 7/52
(52) U.S. Cl. ........................................ 708/708; 708/629
(58) Field of Search .................... 708/708, 702, 708/703, 629

(56) References Cited

U.S. PATENT DOCUMENTS

| | | | |
|---|---|---|---|
| 4,901,270 | * 2/1990 | Galbi et al. | 708/708 |
| 5,343,418 | * 8/1994 | Zinger | 708/702 |
| 5,805,491 | * 8/1998 | Bechade | 708/708 |
| 5,818,747 | * 10/1998 | Wong | 708/708 |

FOREIGN PATENT DOCUMENTS 4-50613    8/1992  (JP).

OTHER PUBLICATIONS

Gensuke GOTO et al., "A 54 X 54 –b Regularly Structured Tree Multiplier," IEEE Journal of Solid–State Circuits, Sep. 1992, vol. 27, No. 9, pp. 1229–1236.

Junji Mori et al., "A 10–ns 54 X 54–b Parallel Structured Full Array Multiplier with 0.5–$\mu$m CMOS Technology," IEEE Journal of Solid–State Circuits, Apr. 1991, vol. 26, No. 4, pp. 600–606.

\* cited by examiner

Primary Examiner—Tan V. Mai
(74) Attorney, Agent, or Firm—Burns, Doane, Swecker & Mathis, LLP

(57) ABSTRACT

A 4-2 compressor circuit calculates the sum of first through fourth inputs and a carry input applied thereto and for furnishing the summation result and first and second carries generated during the calculation of the summation. An input value converting unit inverts the third and fourth inputs only if the third input is logic 0 and the fourth input is logic 1. A summation unit calculates the logical exclusive OR of any two of the first through fourth inputs and the carry input applied to the 4-2 compressor circuit, the logical exclusive OR of any two of the first logical exclusive OR and the remaining three inputs, the logical exclusive OR of any two of the second logical exclusive OR and the remainder, and the logical exclusive OR of the third logical exclusive OR and the remainder. The summation unit then furnishes the fourth logical exclusive OR as the summation result. A carry calculating unit calculates the first carry from the first, third, and fourth inputs. A selecting unit selects either the carry input or the second input according to the logical exclusive OR of the logical exclusive OR of any two of the first through fourth inputs and the logical exclusive OR of the remainder, and then furnishes the selected one as the second carry.

9 Claims, 15 Drawing Sheets

FIG.2

| IN1H | IN2H | IN3H | IN4H | IN3H' | IN4H' | SOH | COH | COTH |
|---|---|---|---|---|---|---|---|---|
| 0 | 0 | 0 | 0 | 0 | 0 | CINH | 0 | 0 |
| 0 | 0 | 0 | 1 | 1 | 0 | $\overline{\text{CINH}}$ | CINH | 0 |
| 0 | 0 | 1 | 0 | 1 | 0 | $\overline{\text{CINH}}$ | CINH | 0 |
| 0 | 1 | 0 | 0 | 0 | 0 | $\overline{\text{CINH}}$ | CINH | 0 |
| 1 | 0 | 0 | 0 | 0 | 0 | $\overline{\text{CINH}}$ | CINH | 0 |
| 0 | 0 | 1 | 1 | 1 | 1 | CINH | 0 | 1 |
| 1 | 1 | 0 | 0 | 0 | 0 | CINH | 1 | 0 |
| 1 | 0 | 1 | 0 | 1 | 0 | CINH | 0 | 1 |
| 1 | 0 | 0 | 1 | 1 | 0 | CINH | 1 | 0 |
| 0 | 1 | 1 | 0 | 1 | 0 | CINH | 0 | 1 |
| 1 | 0 | 1 | 1 | 1 | 0 | $\overline{\text{CINH}}$ | 1 | 1 |
| 0 | 1 | 1 | 1 | 1 | 0 | $\overline{\text{CINH}}$ | CINH | 1 |
| 1 | 1 | 0 | 1 | 1 | 1 | $\overline{\text{CINH}}$ | CINH | 1 |
| 1 | 1 | 1 | 1 | 1 | 1 | $\overline{\text{CINH}}$ | CINH | 1 |
| 0 | 0 | 1 | 1 | 1 | 1 | $\overline{\text{CINH}}$ | CINH | 1 |
| 1 | 1 | 1 | 1 | 1 | 1 | CINH | 1 | 1 |

FIG.9

| IN1H | IN2H | IN3H | IN4H | IN3H' | IN4H' | A | SOH | C0 | C1 | COTH |
|---|---|---|---|---|---|---|---|---|---|---|
| 0 | 0 | 0 | 0 | 0 | 0 | 0 | CINH | 0 | 0 | 0 |
| 0 | 0 | 0 | 1 | 1 | 0 | 1 | $\overline{\text{CINH}}$ | 0 | 1 | 0 |
| 0 | 0 | 1 | 0 | 1 | 0 | 1 | $\overline{\text{CINH}}$ | 0 | 1 | 0 |
| 0 | 1 | 0 | 0 | 0 | 0 | 0 | $\overline{\text{CINH}}$ | 0 | 1 | 0 |
| 1 | 0 | 0 | 1 | 0 | 0 | 0 | $\overline{\text{CINH}}$ | 0 | 1 | 0 |
| 0 | 0 | 1 | 0 | 0 | 1 | 0 | $\overline{\text{CINH}}$ | 1 | 1 | 0 |
| 1 | 1 | 0 | 0 | 0 | 0 | 0 | CINH | 0 | 0 | 1 |
| 1 | 0 | 1 | 1 | 1 | 0 | 1 | CINH | 1 | 1 | 0 |
| 0 | 1 | 0 | 0 | 1 | 0 | 1 | $\overline{\text{CINH}}$ | 1 | 1 | 0 |
| 1 | 0 | 1 | 1 | 1 | 0 | 1 | CINH | 1 | 1 | 0 |
| 0 | 1 | 0 | 0 | 1 | 0 | 1 | $\overline{\text{CINH}}$ | 1 | 1 | 0 |
| 1 | 1 | 1 | 1 | 1 | 1 | 0 | $\overline{\text{CINH}}$ | 0 | 1 | 1 |
| 1 | 1 | 1 | 1 | 1 | 1 | 0 | CINH | 0 | 1 | 1 |
| 0 | 0 | 1 | 1 | 1 | 1 | 0 | $\overline{\text{CINH}}$ | 0 | 1 | 1 |
| 1 | 1 | 1 | 1 | 1 | 1 | 0 | CINH | 1 | 1 | 1 |

FIG.16
(PRIOR ART)

| X1 | X2 | X3 | X4 | Sum | Carry-out1 | Carry-out2 |
|----|----|----|----|-----|------------|------------|
| 0 | 0 | 0 | 0 | Carry-in | 0 | 0 |
| 0 | 0 | 0 | 1 | $\overline{\text{Carry-in}}$ | Carry-in | 0 |
| 0 | 0 | 1 | 0 | $\overline{\text{Carry-in}}$ | Carry-in | 0 |
| 0 | 1 | 0 | 0 | $\overline{\text{Carry-in}}$ | Carry-in | 0 |
| 1 | 0 | 0 | 0 | $\overline{\text{Carry-in}}$ | Carry-in | 0 |
| 0 | 0 | 1 | 1 | Carry-in | 1 | 0 |
| 1 | 1 | 0 | 0 | Carry-in | 1 | 0 |
| 1 | 0 | 0 | 1 | Carry-in | 0 | 1 |
| 0 | 1 | 1 | 0 | Carry-in | 0 | 1 |
| 1 | 0 | 1 | 0 | Carry-in | 0 | 1 |
| 0 | 1 | 0 | 1 | Carry-in | 0 | 1 |
| 1 | 1 | 1 | 0 | $\overline{\text{Carry-in}}$ | Carry-in | 1 |
| 1 | 1 | 0 | 1 | $\overline{\text{Carry-in}}$ | Carry-in | 1 |
| 1 | 0 | 1 | 1 | $\overline{\text{Carry-in}}$ | Carry-in | 1 |
| 0 | 1 | 1 | 1 | $\overline{\text{Carry-in}}$ | Carry-in | 1 |
| 1 | 1 | 1 | 1 | Carry-in | 1 | 1 |

US 6,308,195 B1

4-2 COMPRESSOR CIRCUIT AND VOLTAGE HOLDING CIRCUIT FOR USE IN 4-2 COMPRESSOR CIRCUIT

BACKGROUND OF THE INVENTION

1. Field of the Invention

The present invention relates to a 4-2 compressor circuit that can calculate the sum of four incoming partial products and a carry input applied thereto and then furnish first and second carries generated during the calculation of the summation, and a voltage holding circuit for use in such a 4-2 compressor circuit.

2. Description of the Prior Art

Referring now to FIG. 15, there is illustrated a schematic circuit diagram showing the structure of a prior art 4-2 compressor circuit as disclosed by Mori et al., "A 10-ns 54×54-b Parallel Structured Full Array Multiplier with 0.5-$\mu$m CMOS Technology", IEEE J. Solid-State Circuits, Vol. 26, No. 4, pp. 600–605. A plurality of such 4-2 compressor circuits are arranged in the form of an array within a multiplier so that each of the plurality of 4-2 compressor circuits corresponds to each of a plurality of partial products and each of a plurality of bits of a multiplicand. Each 4-2 compressor circuit is used to calculate the sum of partial products.

In FIG. 15, reference numeral 201 denotes a first calculation circuit for implementing the logical exclusive OR operation on two inputs X3 and X4, 202 denotes a second calculation circuit for implementing the logical exclusive OR operation on two inputs X1 and X2, 203 denotes a third calculation circuit for implementing the logical exclusive OR operation on the logical exclusive OR calculated by the first calculation circuit 201 and the logical exclusive OR calculated by the second calculation circuit 202, and 204 denotes a fourth calculation circuit for implementing the logical exclusive OR operation on the logical exclusive OR calculated by the third calculation circuit 203 and a carry input (Carry-in shown in FIG. 15) applied thereto and for furnishing the logical exclusive OR implementation result (Sum shown in FIG. 15) indicating the sum of the five inputs: the carry input and the other four inputs X1 to X4.

In addition, reference numeral 205 denotes a fifth calculation circuit for furnishing an output at logic 1 when the four inputs X1 to X4 are (0, 0, 0, 0), (0, 0, 0, 1), (0, 0, 1, 0), (0, 1, 0, 0), (1, 0, 0, 0), (1, 0, 0, 1), (0, 1, 1, 0), (0, 1, 0, 1), or (1, 0, 1, 0), and for furnishing an output at logic 0 otherwise, 206 denotes a sixth calculation circuit for inverting the logical exclusive OR of the output of the third calculation circuit 203 and the output of the fifth calculation circuit 205, 207 denotes a seventh calculation circuit for furnishing an output at logic 1 when the output of the third calculation circuit 203, the output of the sixth calculation circuit 206, and the carry input applied thereto are (0, 0, 0), (0, 0, 1) or (1, 0, 0), and for furnishing an output at logic 0 when the output of the third calculation circuit 203, the output of the sixth calculation circuit 206, and the carry input applied thereto are (0, 1, 0), (0, 1, 1) or (1, 0, 1), and 208 denotes an eighth calculation circuit for inverting the output of the seventh calculation circuit 207 and for furnishing the inverted output as a second carry (Carry-out1 shown in FIG. 15).

Furthermore, reference numeral 209 denotes a ninth calculation circuit for furnishing an output at logic 1 when the four inputs X1 to X4 are (0, 0, 0, 0), (0, 0, 0, 1), (0, 0, 1, 0), (0, 1, 0, 0), (1, 0, 0, 0), (0, 0, 1, 1), or (1, 1, 0, 0), and for furnishing an output at logic 0 otherwise, and 210 denotes a tenth calculation circuit for inverting the output of the ninth calculation circuit 209 and for furnishing the inverted output as a first carry (Carry-out2 shown in FIG. 15).

Referring next to FIG. 16, there is illustrated a table showing a relationship between the inputs and outputs of the prior art 4-2 compressor circuit as shown in FIG. 15. The first through fourth calculation circuits 201 to 204 can calculate the sum of the four inputs X1 to X4 and the carry input. The fourth calculation circuit 204 can then furnish the summation result. The first through third and fifth through eighth calculation circuits 201 to 203 and 205 to 208 can calculate a second carry from the four inputs X1 to X4 and the carry input. The eighth calculation circuit 208 can then furnish the second carry. The ninth and tenth calculation circuits 209 and 210 can calculate a first carry from the four inputs X1 to X4 and then furnish the first carry. The truth table of FIG. 16 shows a relationship between the four inputs X1 to X4 and the outputs: the summation result Sum, the first carry Carry-out2, and the second carry Carry-out1.

A problem with such a prior art 4-2 compressor circuit that is so constructed as mentioned above is that it has to wait for the determination of the values of the four incoming signals before it starts calculating the sum of the four inputs and the carry input because there are variations in the times when the values of the four incoming signals are determined by a preceding circuit, and this results in making it difficult to improve the computational speed of the prior art 4-2 compressor circuit.

Another problem is that since each of a number of calculation circuits included in one prior art 4-2 compressor circuit includes a number of P-channel transistors and N-channel transistors, a large layout area is needed when integrating those calculation circuits into one chip. So, it is difficult to reduce the layout area of one prior art 4-2 compressor circuit and hence the layout area of a multiplier including a plurality of such prior art 4-2 compressor circuits.

SUMMARY OF THE INVENTION

The present invention is made to overcome the above problems. It is therefore an object of the present invention to provide a 4-2 compressor circuit capable of reducing the number of combinations of the values of four inputs by inverting two of the four inputs, whose values are determined before the determination of the values of the other two inputs, only if one of the two inputs is logic 0 and the other one is logic 1, calculating the sum of the four inputs and a carry input from a neighboring 4-2 compressor circuit associated with a lower bit of a multiplicand at a high speed, and calculating first and second carries during the calculation of the summation at a high speed, using a simple circuit structure, a voltage holding circuit for use in such a 4-2 compressor circuit, and a multiplier including a plurality of such 4-2 compressor circuits.

It is another object of the present invention to provide a 4-2 compressor circuit that can receive five pairs of complementary incoming signals respectively representing four inputs and a carry input, and furnish three pairs of complementary output signals respectively indicating the sum of the four inputs and the carry input, and first and second carries generated during the calculation of the summation, the 4-2 compressor circuit including a plurality of calculation circuits, such as exclusive OR circuits, each constructed of a small number of N-channel transistors, thereby reducing the layout area of the 4-2 compressor circuit when integrating the plurality of calculation circuits into one chip, a voltage holding circuit for use in such a 4-2 compressor circuit, and a multiplier including a plurality of such 4-2 compressor circuits.

In accordance with one aspect of the present invention, there is provided a 4-2 compressor circuit for calculating the sum of first through fourth inputs and a carry input applied thereto and for furnishing the summation result and first and second carries generated during the calculation of the sum, the 4-2 compressor circuit comprising: an input value converting unit for inverting the third and fourth inputs only if the third input is logic 0 and the fourth input is logic 1; a summation unit for calculating the logical exclusive OR of any two of the first through fourth inputs and the carry input applied to the 4-2 compressor circuit, the logical exclusive OR of any two of the first logical exclusive OR and the remaining three inputs, the logical exclusive OR of any two of the second logical exclusive OR and the remainder, and the logical exclusive OR of the third logical exclusive OR and the remainder, and for furnishing the fourth logical exclusive OR as the summation result; a carry calculating unit for calculating the first carry from the first, third, and fourth inputs, and for furnishing the first carry; and a selecting unit for selecting either the carry input or the second input according to the logical exclusive OR of the logical exclusive OR of any two of the first through fourth inputs and the logical exclusive OR of the remainder, and for furnishing the selected one as the second carry.

In accordance with a preferred embodiment of the present invention, the 4-2 compressor circuit can receive first through fifth pairs of complementary incoming signals respectively indicating the first through fourth inputs and the carry input, and furnish first through third pairs of complementary output signals respectively indicating the summation result, and the first and second carries. The summation unit can include a first calculation circuit for calculating the logical exclusive OR of any two of the first through fourth inputs, a second calculation circuit for calculating the logical exclusive OR of the remainder, a third calculation circuit for calculating the logical exclusive OR of the logical exclusive OR calculation results made by the first and second calculation circuits, and a fourth calculation circuit for calculating the logical exclusive OR of the logical exclusive OR calculation result made by the third calculation circuit and the carry input. Each of the first through fourth calculation circuits can implement the logical exclusive OR operation on a first pair of complementary incoming variables applied thereto by way of first and second signal lines and a second pair of complementary incoming variables applied thereto by way of third and fourth signal lines, respectively, and furnish a pair of complementary output signals indicating the logical exclusive OR implementation result by way of fifth and sixth signal lines. Each of the first through fourth calculation circuits can include a first N-channel transistor having a gate terminal electrically connected to the first signal line, a second terminal electrically connected to the third signal line, and a third terminal electrically connected to the fifth signal line, a second N-channel transistor having a gate terminal electrically connected to the second signal line, a second terminal electrically connected to the third signal line, and a third terminal electrically connected to the sixth signal line, a third N-channel transistor having a gate terminal electrically connected to the first signal line, a second terminal electrically connected to the fourth signal line, and a third terminal electrically connected to the sixth signal line, and a fourth N-channel transistor having a gate terminal electrically connected to the second signal line, a second terminal electrically connected to the fourth signal line, and a third terminal electrically connected to the fifth signal line. The selecting unit can a first N-channel transistor having a gate terminal electrically connected to the third terminals of the first and fourth N-channel transistors of the third calculation circuit, a second terminal electrically connected to an input signal line for receiving one of the second pair of incoming signals, and a third terminal electrically connected to an output signal line for furnishing one of the third pair of output signals indicating the second carry, a second N-channel transistor having a gate terminal electrically connected to the third terminals of the second and third N-channel transistors of the third calculation circuit, a second terminal electrically connected to an input signal line for receiving one of the fifth pair of incoming signals indicating the carry input, and a third terminal electrically connected to the output signal line for furnishing one of the pair of output signals indicating the second carry, a third N-channel transistor having a gate terminal electrically connected to the third terminals of the first and fourth N-channel transistors of the third calculation circuit, a second terminal electrically connected to an input signal line for receiving the other one of the second pair of incoming signals, and a third terminal electrically connected to an output signal line for furnishing the other one of the third pair of output signals indicating the second carry, and a fourth N-channel transistor having a gate terminal electrically connected to the third terminals of the second and third N-channel transistors of the third calculation circuit, a second terminal electrically connected to an input signal line for receiving the other one of the fifth pair of incoming signals indicating the carry input, and a third terminal electrically connected to the output signal line for furnishing the other one of the third pair of output signals indicating the second carry.

In accordance with another preferred embodiment of the present invention, when the first carry calculated has a predetermined value, the carry calculation unit can furnish an output having a value of ground as the first carry; otherwise, the carry calculation unit can furnish, as the first carry, an output having a value corresponding to a difference between a power supply voltage and a threshold voltage between the gate and source terminals of an N-channel transistor.

In accordance with another preferred embodiment of the present invention, the 4-2 compressor circuit can further comprise a voltage holding unit for pulling up a higher-voltage one of the first and second signal lines of the fourth calculation circuit at a power supply voltage, and for holding a higher-voltage voltage of the pair of input signal lines of the selecting unit, for receiving the fifth pair of incoming signals indicating the carry input, which are electrically connected to the second and fourth N-channel transistors of the selecting unit, respectively, at a voltage corresponding to a difference between the power supply voltage and a threshold voltage between the gate and source terminals of an N-channel transistor.

In accordance with another preferred embodiment of the present invention, the 4-2 compressor circuit can further comprise a voltage holding unit for pulling up a higher-voltage one of a signal line electrically connected to the gate terminals of the first and third N-channel transistors of the selecting unit and another signal line electrically connected to the gate terminals of the second and fourth N-channel transistors of the selecting unit to a power supply voltage, and for holding a higher-voltage one of the third and fourth signal lines of the fourth calculation circuit at a voltage corresponding to a difference between the power supply voltage and a threshold voltage between the gate and source terminals of an N-channel transistor.

In accordance with another preferred embodiment of the present invention, the 4-2 compressor circuit can further comprise a plurality of precharge units each for precharging a pair of outputs or inputs of each of first through fourth calculation circuits and the selecting unit so that they have a power supply voltage.

In accordance with another aspect of the present invention, there is provided a 4-2 compressor circuit for calculating the sum of first through fourth inputs and a carry input applied thereto and for furnishing the summation result and first and second carries generated during the calculation of the sum, the 4-2 compressor circuit comprising: an input value converting unit for inverting the third and fourth inputs only if the third input is logic 0 and the fourth input is logic 1; a summation unit for calculating the logical exclusive OR of the first and second inputs, the logical exclusive OR of the third and fourth inputs, the logical exclusive OR of the first logical exclusive OR and the second logical exclusive OR, and the logical exclusive OR of the third logical exclusive OR and the carry input, and for furnishing the fourth logical exclusive OR as the summation result; a carry calculating unit for calculating the first carry from the first, second, and fourth inputs, and for furnishing the first carry; a first selecting unit for selecting either the fourth input or the second logical exclusive OR of the third and fourth inputs, according to the first logical exclusive OR of the first and second inputs, and for furnishing the selected one as its output; a second selecting unit for selecting either the third input or a predetermined value, according to the first logical exclusive OR of the first and second inputs, and for furnishing the selected one as its output; and a third selecting unit for selecting either the output of the first selecting unit or the output of the second selecting unit, according to the carry input, and for furnishing the selected one as the second carry.

In accordance with another aspect of the present invention, there is provided a 4-2 compressor circuit for calculating the sum of first through fourth inputs and a carry input applied thereto and for furnishing the summation result and first and second carries generated during the calculation of the sum, the 4-2 compressor circuit comprising: an input value converting unit for inverting the third and fourth inputs only if the third input is logic 0 and the fourth input is logic 1; a summation unit for calculating the logical exclusive OR of the third and fourth inputs, the logical exclusive OR of the first logical exclusive OR and the carry input, the logical exclusive OR of the first and second inputs, and the logical exclusive OR of the second logical exclusive OR and the third logical exclusive OR, and for furnishing the fourth logical exclusive OR as the summation result; a carry calculating unit for calculating the first carry from the first, second, and fourth inputs, and for furnishing the first carry; a first selecting unit for selecting either the first logical exclusive OR of the third and fourth inputs or a predetermined value, according to the carry input, and for furnishing the selected one as its output; a second selecting unit for selecting either the third input or the fourth input, according to the carry input, and for furnishing the selected one as its output; and a third selecting unit for selecting either the output of the first selecting unit or the output of the second selecting unit, according to the third logical exclusive OR of the first and second inputs, and for furnishing the selected one as the second carry.

In accordance with another aspect of the present invention, there is provided a voltage holding circuit for use in a 4-2 compressor circuit that receives first through fifth pairs of complementary incoming signals respectively indicating first through fourth inputs and a carry input, and calculates the sum of the first through fourth inputs and the carry input and then furnishes first through third pairs of complementary output signals respectively indicating the summation result, and first and second carries, the voltage holding circuit pulling up a higher-voltage one of a pair of complementary signals to a power supply voltage, and for furnishing the signal that has been pulled up, and also holding the higher-voltage signal at a predetermined voltage corresponding to a difference between the power supply voltage and a threshold voltage between the gate and source terminals of an N-channel transistor, and for furnishing the signal held at the predetermined voltage.

In accordance with another aspect of the present invention, there is provided a multiplier including a plurality of 4-2 compressor circuits each for calculating the sum of first through fourth inputs and a carry input applied thereto and for furnishing the summation result and first and second carries generated during the calculation of the sum, for calculating the sum of a plurality of partial products, each of the plurality of 4-2 compressor circuits comprising: an input value converting unit for inverting the third and fourth inputs only if the third input is logic 0 and the fourth input is logic 1; a summation unit for calculating the logical exclusive OR of any two of the first through fourth inputs and the carry input applied to the 4-2 compressor, the logical exclusive OR of any two of the first logical exclusive OR and the remaining three inputs, the logical exclusive OR of any two of the second logical exclusive OR and the remainder, and the logical exclusive OR of the third logical exclusive OR and the remainder, and for furnishing the fourth logical exclusive OR as the summation result; a carry calculating unit for calculating the first carry from the first, third, and fourth inputs, and for furnishing the first carry; and a selecting unit for selecting either the carry input or the second input according to the logical exclusive OR of the logical exclusive OR of any two of the first through fourth inputs and the logical exclusive OR of the remainder, and for furnishing the selected one as the second carry.

In accordance with another aspect of the present invention, there is provided a multiplier including a plurality of 4-2 compressor circuits each for calculating the sum of first through fourth inputs and a carry input applied thereto and for furnishing the summation result and first and second carries generated during the calculation of the sum, for calculating the sum of a plurality of partial products, each of the plurality of 4-2 compressor circuits comprising: an input value converting unit for inverting the third and fourth inputs only if the third input is logic 0 and the fourth input is logic 1; a summation unit for calculating the logical exclusive OR of the first and second inputs, the logical exclusive OR of the third and fourth inputs, the logical exclusive OR of the first logical exclusive OR and the second logical exclusive OR, and the logical exclusive OR of the third logical exclusive OR and the carry input, and for furnishing the fourth logical exclusive OR as the summation result; a carry calculating unit for calculating the first carry from the first, second, and fourth inputs, and for furnishing the first carry; a first selecting unit for selecting either the fourth input or the second logical exclusive OR of the third and fourth inputs, according to the first logical exclusive OR of the first and second inputs, and for furnishing the selected one as its output; a second selecting unit for selecting either the third input or a predetermined value, according to the first logical exclusive OR of the first and second inputs, and for furnishing the selected one as its output; and a third selecting unit for selecting either the output of the first selecting unit or the output of the second selecting unit, according to the carry input, and for furnishing the selected one as the second carry.

In accordance with another aspect of the present invention, there is provided a multiplier including a plurality of 4-2 compressor circuits each for calculating the sum of first through fourth inputs and a carry input applied thereto and for furnishing the summation result and first and second carries generated during the calculation of the sum, for calculating the sum of a plurality of partial products, each of the plurality of 4-2 compressor circuits comprising: an input value converting unit for inverting the third and fourth inputs only if the third input is logic 0 and the fourth input is logic 1; a summation unit for calculating the logical exclusive OR of the third and fourth inputs, the logical exclusive OR of the first logical exclusive OR and the carry input, the logical exclusive OR of the first and second inputs, and the logical exclusive OR of the second logical exclusive OR and the third logical exclusive OR, and for furnishing the fourth logical exclusive OR as the summation result; a carry calculating unit for calculating the first carry from the first, second, and fourth inputs, and for furnishing the first carry; a first selecting unit for selecting either the first logical exclusive OR of the third and fourth inputs or a predetermined value, according to the carry input, and for furnishing the selected one as its output; a second selecting unit for selecting either the third input or the fourth input, according to the carry input, and for furnishing the selected one as its output; and a third selecting unit for selecting either the output of the first selecting unit or the output of the second selecting unit, according to the third logical exclusive OR of the first and second inputs, and for furnishing the selected one as the second carry.

Further objects and advantages of the present invention will be apparent from the following description of the preferred embodiments of the invention as illustrated in the accompanying drawings, in the several figures of which like reference numerals identify identical elements.

BRIEF DESCRIPTION OF THE DRAWINGS

FIG. 2 is a table showing a relationship between the values of inputs applied to the 4-2 compressor circuit according to the first embodiment of the present invention, and the values of outputs furnished by the 4-2 compressor circuit;

FIG. 9 is a table showing a relationship between the values of inputs and those of outputs of the 4-2 compressor circuit according to the fifth embodiment of the present invention;

FIG. 16 is a table showing a relationship between the values of inputs and those of outputs of the prior art 4-2 compressor circuit of FIG. 15.

DETAILED DESCRIPTION OF THE PREFERRED EMBODIMENTS

First Embodiment

Figure 1:
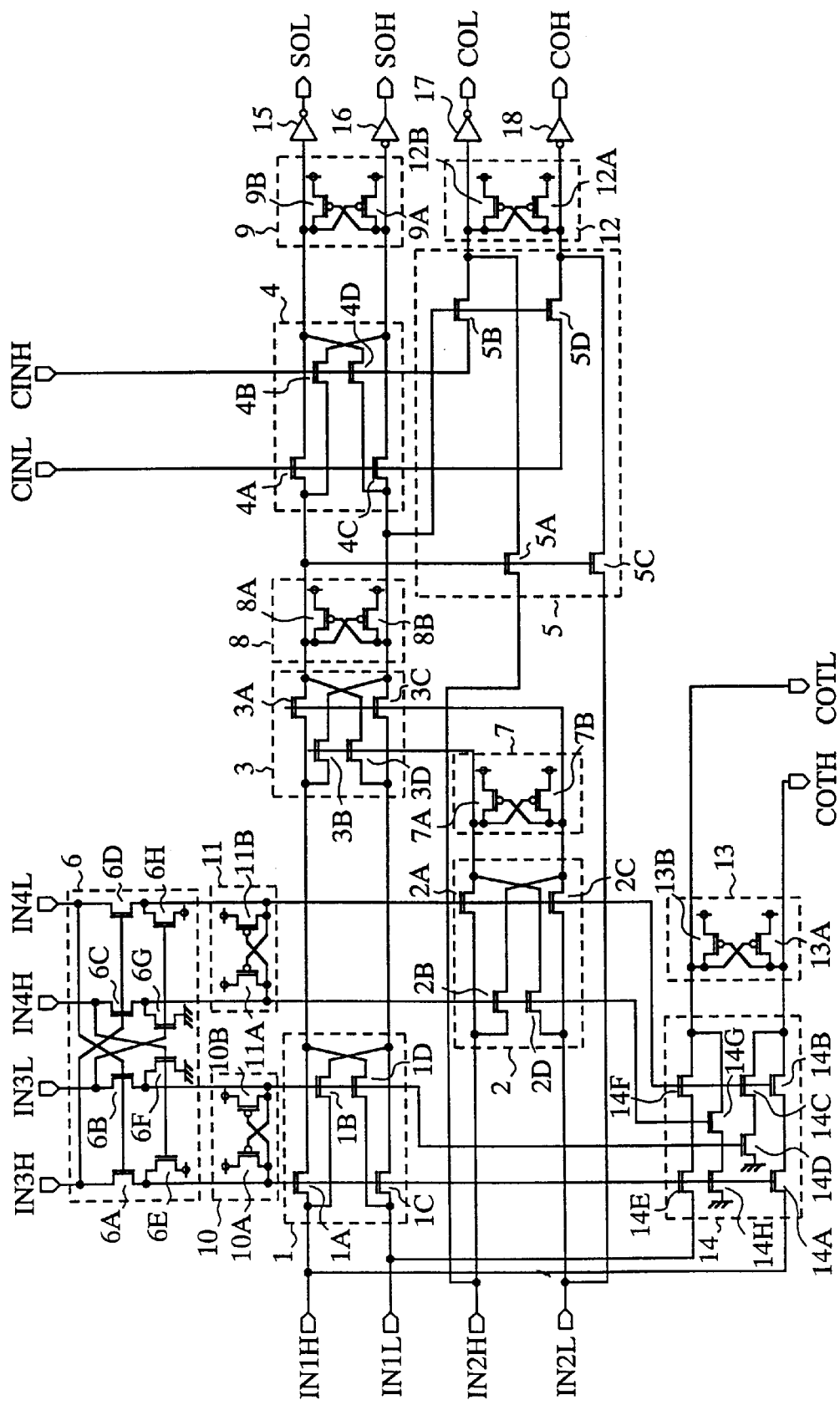
FIG. 1 is a schematic circuit diagram showing the structure of a 4-2 compressor circuit according to a first embodiment of the present invention.

Referring next to FIG. 1, there is illustrated a schematic circuit diagram showing the structure of a 4-2 compressor circuit according to a first embodiment of the present invention. For example, a multiplier can have a plurality of 4-2 compressor circuits arranged in the form of an array such that each of the plurality of compressors corresponds to each of partial products and each of bits of a multiplicand to be multiplied by a multiplier. Each of the plurality of compressor circuits can calculate the summation of four inputs applied thereto and a first carry applied thereto from its neighboring 4-2 compressor circuit associated with the lower bit of the multiplicand, and then furnish the summation result and first and second carries generated during the calculation of the summation.

As shown in FIG. 1, the 4-2 compressor circuit receives first through fourth pairs of complementary incoming signals representing the four inputs, respectively, and a fifth pair of complementary incoming signals representing the carry input, by way of first through fifth pairs of input terminals IN1H and IN1L, IN2H and IN2L, IN3H and IN3L, IN4H and IN4L, and CINH and CINL, respectively. In FIG. 1, reference numeral 1 denotes a first exclusive OR or EXOR circuit for implementing the logical exclusive OR operation on the third pair of complementary incoming signals, which are applied thereto by way of an input value converting circuit 6, and the first pair of complementary incoming signals, which are applied to by way of the first pair of input terminals IN1H and IN1L. The input value converting circuit 6 can either invert the third pair of complementary incoming signals applied thereto by way of the third pair of input terminals IN3H and IN3L and then furnish the inverted signals to the first EXOR circuit 1, or furnish the third pair of complementary incoming signals applied thereto to the first EXOR circuit 1, just as they are. The first EXOR circuit 1 then furnishes a pair of output signals having complementary values indicating the logical exclusive OR implementation result to a third EXOR circuit 3.

Incoming signals received by way of input terminals IN1L, IN2L, IN4L, and CINL have values that are complementary to the values of incoming signals received by way of input terminals IN1H, IN2H, IN4H, and CINH, respectively. Similarly, output signals furnished by way of output terminals SOL, COL, and COTL have values that are complementary to the values of output signals furnished by way of output terminals SOH, COH, and COTH, respectively. In other words, each of those signals has the same value as the inverted value of the other one of the pair.

The first EXOR circuit 1 includes a first N-channel transistor 1A having a gate terminal electrically connected to the input value converting circuit 6 by way of a first signal line, a second terminal electrically connected to the input terminal IN1H by way of a third signal line, and a third terminal electrically connected to the third EXOR circuit 3 by way of a fifth signal line; a second N-channel transistor 1B having a gate terminal electrically connected to the input value converting circuit 6 by way of a second signal line, a second terminal electrically connected to the input terminal IN1H by way of the third signal line, and a third terminal electrically connected to the third EXOR circuit 3 by way of a sixth signal line; a third N-channel transistor 1C having a gate terminal electrically connected to the input value converting circuit 6 by way of the first signal line, a second terminal electrically connected to the input terminal IN1L by way of a fourth signal line, and a third terminal electrically connected to the EXOR circuit 3 by way of a sixth signal line; and a fourth N-channel transistor 1D having a gate terminal electrically connected to the input value converting circuit 6 by way of the second signal line, a second terminal electrically connected to the input terminal IN1L by way of the fourth signal line, and a third terminal electrically connected to the third EXOR circuit 3 by way of the fifth signal line.

Reference numeral 2 denotes a second exclusive OR or EXOR circuit comprised of four N-channel transistors 2A to 2D, like the first EXOR circuit 1, for implementing the logical exclusive OR operation on the fourth pair of complementary incoming signals, which are applied thereto by way of the input value converting circuit 6, and the second pair of complementary incoming signals, which are applied to by way of the second pair of input terminals IN2H and IN2L. The input value converting circuit 6 can either invert the fourth pair of complementary incoming signals applied thereto by way of the fourth pair of input terminals IN4H and IN4L and then furnish the inverted signals to the second EXOR circuit 2, or furnish the fourth pair of complementary incoming signals to the second EXOR circuit 2, just as they are. The second EXOR circuit 2 then furnishes a pair of complementary output signals as the logical exclusive OR implementation result to the third EXOR circuit 3.

Like the first EXOR circuit 1, the third EXOR circuit 3 is comprised of four N-channel transistors 3A to 3D and implements the logical exclusive OR operation on the pair of complementary output signals of the first EXOR circuit 1, and the pair of complementary output signals of the second EXOR circuit 2. The third EXOR circuit 3 then furnishes a pair of complementary output signals indicating the logical exclusive OR implementation result to both a fourth EXOR circuit 4 and a selector circuit 5.

Like the EXOR circuit 1, the fourth EXOR circuit 4 is comprised of four N-channel transistors 4A to 4D and implements the logical exclusive OR operation on the pair of complementary output signals of the third EXOR circuit 3, and the fifth pair of complementary incoming signals applied thereto by way of the fifth pair of input terminals CINH and CINL, indicating the carry input. The fourth EXOR circuit 4 then furnishes a pair of complementary output signals indicating the logical exclusive OR implementation result to inverter circuits 15 and 16.

The selector circuit 5 can select either the second pair of complementary incoming signals applied to the 4-2 compressor circuit by way of the second pair of input terminals IN2H and IN2L or the fifth pair of complementary incoming signals applied thereto by way of the fifth pair of input terminals CINH and CINL, indicating the carry input, according to the values of the output pair of complementary signals furnished by the third EXOR circuit 3, and furnish the selected pair of complementary signals to inverter circuits 17 and 18.

The selector circuit 5 includes a first N-channel transistor 5A having a gate terminal electrically connected to the first and fourth N-channel transistors 3A and 3D of the third EXOR circuit 3, a second terminal electrically connected to the input terminal IN2H, and a third terminal electrically connected to the third inverter circuit 17; a second N-channel transistor 5B having a gate terminal electrically connected to the second and third N-channel transistors 3B and 3C of the third EXOR circuit 3, a second terminal electrically connected to the input terminal CINH for receiving the first carry, and a third terminal electrically connected to the third inverter circuit 17; a third N-channel transistor 5C having a gate terminal electrically connected to the first and fourth N-channel transistors 3A and 3D of the third EXOR circuit 3, a second terminal electrically connected to the input terminal IN2L, and a third terminal electrically connected to the fourth inverter circuit 18; and a fourth N-channel transistor 5D having a gate terminal electrically connected to the second and third N-channel transistors 3B and 3C of the third EXOR circuit 3, a second terminal electrically connected to the input terminal CINL for receiving the first carry, and a third terminal electrically connected to the fourth inverter circuit 18.

When one of the third pair of incoming signals applied to the input terminal IN3H is at logic 0 and one of the fourth pair of incoming signals applied to the input terminal IN4H is at logic 1, the input value converting circuit 6 inverts the third and fourth pairs of incoming signals, and then furnishes the inverted values of the third pair of incoming signals applied thereto by way of the third pair of input terminals IN3H and IN3L to both the first EXOR circuit 1 and a carry generating circuit 14, and the inverted values of the fourth pair of incoming signals applied thereto by way of the fourth pair of input terminals IN4H and IN4L to both the second EXOR circuit 2 and the carry generating circuit 14. In contrast, when one of the third pair of incoming signals applied to the input terminal IN3H is not at logic 0 or one of the fourth pair of incoming signals applied to the input terminal IN4H is not at logic 1, the input value converting circuit 6 furnishes the third pair of incoming signals applied thereto by way of the third pair of input terminals IN3H and IN3L to both the first EXOR circuit 1 and the carry generating circuit 14, just as they are, and the fourth pair of incoming signals applied thereto by way of the fourth pair of input terminals IN4H and IN4L to both the second EXOR circuit 2 and the carry generating circuit 14, just as they are.

The input value converting circuit 6 includes a first N-channel transistor 6A having a gate terminal electrically connected to the input terminal IN4L, a second terminal electrically connected to the input terminal IN3H, and a third terminal electrically connected to the gate terminals of the first and third N-channel transistors 1A and 1C of the first EXOR circuit 1; a second N-channel transistor 6B having a gate terminal electrically connected to the input terminal IN4L, a second terminal electrically connected to the input terminal IN3L, and a third terminal electrically connected to the gate terminals of the second and fourth N-channel transistors 1B and 1D of the first EXOR circuit 1; a third N-channel transistor 6C having a gate terminal electrically connected to the input terminal IN3H, a second terminal electrically connected to the input terminal IN4H, and a third terminal electrically connected to the gate terminals of the second and fourth N-channel transistors 2B and 2D of the second EXOR circuit 2; a fourth N-channel transistor 6D having a gate terminal electrically connected to the input terminal IN3H, a second terminal electrically connected to the input terminal IN4L, and a third terminal electrically connected to the gate terminals of the first and third N-channel transistors 2A and 2C of the second EXOR circuit 2; a fifth N-channel transistor 6E having a gate terminal electrically connected to the input terminal IN4H, a second terminal electrically connected to a power supply, and a third terminal electrically connected to the third terminal of the first N-channel transistors 6A; a sixth N-channel transistor 6F having a gate terminal electrically connected to the input terminal IN4H, a second terminal electrically connected to a ground, and a third terminal electrically connected to the third terminal of the second N-channel transistors 6B; a seventh N-channel transistor 6G having a gate terminal electrically connected to the input terminal IN3L, a second terminal electrically connected to a ground, and a third terminal electrically connected to the third terminal of the third N-channel transistors 6C; and an eighth N-channel transistor 6H having a gate terminal electrically connected to the input terminal IN3L, a second terminal electrically connected to a power supply, and a third terminal electrically connected to the third terminal of the fourth N-channel transistors 6D.

Reference numeral 7 denotes a first voltage compensation circuit disposed between two signal lines electrically connected to the two outputs of the second EXOR circuit 2, for pulling up the one of the two signal lines having a higher voltage to a power supply voltage. The first voltage compensation circuit 7 includes a first P-channel transistor 7A having a gate terminal electrically connected to one of the two signal lines electrically connected to the second EXOR circuit 2, a source terminal electrically connected to a power supply, and a drain terminal electrically connected to the other one of the two signal lines; and a second P-channel transistor 7B having a gate terminal electrically connected to the drain terminal of the first P-channel transistor 7A, a source terminal electrically connected to a power supply, and a drain terminal electrically connected to the gate terminal of the fist P-channel transistor 7A. In addition, reference numerals 8 to 13 denote second through seventh voltage compensation circuits constructed in the same manner as the first voltage compensation circuit 7 and disposed at the respective outputs of the third EXOR circuit 3, the fourth EXOR circuit 4, the input value converting circuit 6, the selector circuit 5, and the carry signal generating circuit 14.

The input value converting circuit 6 either supplies the third pair of complementary incoming signals applied thereto by way of the third pair of input terminals IN3H and IN3L to the carry generating circuit 14, just as they are, or inverts the third pair of complementary incoming signals and then furnishes the inverted pair of complementary incoming signals to the carry generating circuit 14. Similarly, the input value converting circuit 6 either supplies the fourth pair of complementary incoming signals applied thereto by way of the fourth pair of input terminals IN4H and IN4L to the carry generating circuit 14, just as they are, or inverts the fourth pair of complementary incoming signals and then furnishes the inverted pair of complementary incoming signals to the carry generating circuit 14. The carry generating circuit 14 then calculates a first carry from the two pairs of incoming signals applied thereto by way of the input value converting circuit 6 and the first pair of complementary incoming signals applied thereto by way of the first pair of input terminals IN1H and IN1L, and furnishes a pair of complementary output signals indicating the first carry calculated by way of the third pair of output terminals COTH and COTL.

The carry generating circuit 14 includes a first N-channel transistor 14A having a gate terminal electrically connected to the first N-channel transistor 6A of the input value converting circuit 6, a second terminal electrically connected to the input terminal IN1H, and a third terminal electrically connected to a second N-channel transistor 14B; the second N-channel transistor 14B having a gate terminal electrically connected to the fourth N-channel transistor 6D of the input value converting circuit 6, a second terminal electrically connected to the third terminal of the first N-channel transistor 14A, and a third terminal electrically connected to the output terminal COTH; a third N-channel transistor 14C having a gate terminal electrically connected to the fourth N-channel transistor 6D of the input value converting circuit 6, a second terminal electrically connected to a fourth N-channel transistor 14D, and a third terminal electrically connected to the output terminal COTH; the fourth N-channel transistor 14D having a gate terminal electrically connected to the second N-channel transistor 6B of the input value converting circuit 6, a second terminal electrically connected to a ground, and a third terminal electrically connected to the second terminal of the third N-channel transistor 14C; a fifth N-channel transistor 14E having a gate terminal electrically connected to the first N-channel transistor 6A of the input value converting circuit 6, a second terminal electrically connected to the input terminal IN1L, and a third terminal electrically connected to a sixth N-channel transistor 14F; the sixth N-channel transistor 14F having a gate terminal electrically connected to the fourth N-channel transistor 6D of the input value converting circuit 6, a second terminal electrically connected to the third terminal of the fifth N-channel transistor 14E, and a third terminal electrically connected to the output terminal COTL; a seventh N-channel transistor 14G having a gate terminal electrically connected to the third N-channel transistor 6C of the input value converting circuit 6, a second terminal electrically connected to an eighth N-channel transistor 14H, and a third terminal electrically connected to the output terminal COTL; and the eighth N-channel transistor 14H having a gate terminal electrically connected to the first N-channel transistor 6A of the input value converting circuit 6, a second terminal electrically connected to a ground, and a third terminal electrically connected to the second terminal of the seventh N-channel transistor 14G.

The first inverter circuit 15, which is electrically connected to both the first and fourth N-channel transistors 4A and 4D of the fourth EXOR circuit 4, inverts one of the pair of output signals of the fourth EXOR circuit 4 and then furnishes the inverted output as one of a first pair of complementary output signals indicating the sum of the carry input and the other four inputs by way of the output terminal SOL. The second inverter circuit 16, which is electrically connected to both the second and third N-channel transistors 4B and 4C of the fourth EXOR circuit 4, inverts the other one of the pair of output signals of the fourth EXOR circuit 4 and then furnishes the inverted other output as the other one of the first pair of complementary output signals indicating the sum of the carry input and the other four inputs by way of the output terminal SOH.

The third inverter circuit 17, which is electrically connected to both the first and second N-channel transistors 5A and 5B of the selector circuit 5, inverts one of the pair of output signals of the selector circuit 5 and then furnishes the inverted output as one of a second pair of complementary output signals indicating the second carry by way of the output terminal COL. The fourth inverter circuit 18, which is electrically connected to both the third and fourth N-channel transistors 5C and 5D of the selector circuit 5, inverts the other one of the pair of output signals of the selector circuit 5 and then furnishes the inverted other output as the other one of the second pair of complementary output signals indicating the second carry by way of the output terminal COH.

In general, when constructing a multiplier using a plurality of 4-2 compressor circuits, the connection between two neighboring 4-2 compressor circuits arranged in a direction with respect to bits of a multiplicand can be established by connecting the output terminals COTH and COTL of one of them with the input terminals CINH and CINL of the other one, respectively, for example. Similarly, the connection between two neighboring 4-2 compressors arranged in a direction with respect to bits of a multiplier can be established by connecting the output terminals SOH and SOL, and COH and COL of one of them with the input terminals IN1H and IN1L, and IN2H and IN2L of the other one, respectively, for example.

Referring next to FIG. 2, there is illustrated a table showing a relationship between the values of inputs applied to the 4-2 compressor circuit according to the first embodiment of the present invention, and the values of outputs furnished by the 4-2 compressor circuit. As shown in FIG. 2, when an input at the input terminal IN3H, which is one of the third pair of complementary incoming signals applied by way of the third pair of input terminals IN3H and IN3L, is at logic 0, and an input at the input terminal IN4H, which is one of the fourth pair of complementary incoming signals applied by way of the fourth pair of input terminals IN4H and IN4L, is at logic 1, the input value converting circuit 6 can invert those inputs. The input value converting circuit 6 then furnishes the inverted value IN3H' (shown in FIG. 2) of the one of the third pair of complementary inputs applied thereto via the third pair of input terminals IN3H and IN3L to both the first EXOR circuit 1 and the carry generating circuit 14, and the inverted value IN4H' (shown in FIG. 2) of the one of the fourth pair of complementary inputs applied thereto via the fourth pair of input terminals IN4H and IN4L to both the second EXOR circuit 2 and the carry generating circuit 14. In contrast, when either the input at the input terminal IN3H is not at logic 0 or the other input at the input terminal IN4H is not at logic 1, the input value converting circuit 6 furnishes the third pair of complementary inputs applied thereto via the third pair of input terminals IN3H and IN3L to both the first EXOR circuit 1 and the carry generating circuit 14, just as they are, and the fourth pair of complementary inputs applied thereto via the fourth pair of input terminals IN4H and IN4L to both the second EXOR circuit 2 and the carry generating circuit 14, just as they are.

Since inverting the third and fourth pairs of complementary incoming signals applied to the third and four pairs of input terminals IN3H and IN3L, and IN4H and IN4L does not change the sum of the four inputs including the two inputs applied to those input terminals when the IN3H input is at logic 0 and the IN4H input is at logic 1, it presents no problem.

When the first EXOR circuit 1 receives the third pair of complementary incoming signals, which have been applied to the third pair of input terminals IN3H and IN3L and inverted or supplied thereto, just as they are, by the input value converting circuit 6, and the first pair of incoming signals applied thereto by way of the first pair of input terminals IN1H and IN1L, it implements the logical exclusive OR operation on the two pairs of incoming signals, respectively, and then furnishes a pair of outputs indicating the logical exclusive OR implementation result to the third EXOR circuit 3. Similarly, when the second EXOR circuit 2 receives the fourth pair of complementary incoming signals, which have been applied to the fourth pair of input terminals IN4H and IN4L and inverted or supplied thereto, just as they are, by the input value converting circuit 6, and the second pair of incoming signals applied thereto by way of the second pair of input terminals IN2H and IN2L, it implements the logical exclusive OR operation on the two pairs of incoming signals, respectively, and then furnishes a pair of outputs indicating the logical exclusive OR implementation result to the third EXOR circuit 3.

The third EXOR circuit 3 then implements the logical exclusive OR operation on the pair of outputs of the first EXOR circuit 1 and the pair of outputs of the second EXOR circuit 2, respectively, and furnishes a pair of outputs indicating the logical exclusive OR implementation result to both the fourth EXOR circuit 4 and the selector circuit 5. The fourth EXOR circuit 4 then implements the logical exclusive OR operation on the pair of outputs of the third EXOR circuit 3 and the fifth pair of incoming signals indicating the carry input, which are applied thereto by way of the fifth pair of input terminals CINH and CINL, respectively, and furnishes a pair of output signals indicating the logical exclusive OR implementation result, as the sum of the five values: the carry input and the four inputs, to the first and second inverter circuits 15 and 16. The first and second inverter circuits 15 and 16 then invert the pair of outputs of the fourth EXOR circuit 4 and furnishes the inverted pair of outputs by way of the first pair of output terminals SOL and SOH. SOH in FIG. 2 shows the value of one of the inverted pair of output signals that is furnished via the output terminal SOH.

The first output of the fourth EXOR circuit 4 that appears at the connecting point between the first and fourth N-channel transistors 4A and 4D is the sum of the values of ones of the first through fourth pairs of incoming signals that are applied to the input terminals IN1H, IN2H, IN3H, and IN4H, whereas the second output of the fourth EXOR circuit 4 that appears at the connecting point between the second and third N-channel transistors 4B and 4C is the sum of the values of the other ones of the first through fourth pairs of incoming signals that are applied to the other input terminals IN1L, IN2L, IN3L, and IN4L. The second inverter circuit 16 inverts the second output of the fourth EXOR circuit 4 that appears at the connecting point between the second and third N-channel transistors 4B and 4C, and then furnishes the inverted result, which corresponds to the sum of the values of the ones of the first through fourth pairs of incoming signals that are applied to the input terminals IN1H, IN2H, IN3H, and IN4H, by way of the output terminal SOH. On the other hand, the first inverter circuit 15 inverts the first output of the fourth EXOR circuit 4 that appears at the connecting point between the first and fourth N-channel transistors 4A and 4D, and then furnishes the inverted result, which corresponds to the sum of the values of the other ones of the first through fourth pairs of incoming signals that are applied to the other input terminals IN1L, IN2L, IN3L, and IN4L, by way of the other output terminal SOL. In other words, the pair of first and second inverter circuits 15 and 16 substantially furnish the pair of outputs of the fourth EXOR circuit 4 by way of the first pair of output terminals SOH and SOL, just as they are. It is therefore clear that, as an alternative, the first and second inverter circuits 15 and 16 can be removed if the output terminals SOL and SOH are interchanged.

In this manner, the first through fourth EXOR circuits 1 to 4 calculate the sum of the carry input from a neighboring 4-2 compressor circuit associated with a lower bit of the multiplicand and the four inputs, and then furnish a pair of complementary output signals indicating the summation result by way of the first pair of output terminals SOH and SOL.

On the other hand, the selector circuit 5 selects either the second pair of incoming signals applied thereto by way of the second pair of input terminals IN2H and IN2L or the fifth pair of incoming signals indicating the carry input from the neighboring 4-2 compressor circuit, according to the values of the pair of outputs of the third EXOR circuit 3. The selector circuit 5 then furnishes the selected pair of incoming signals as the second carry to the third and fourth inverter circuits 17 and 18. The third and fourth inverter circuits 17 and 18 then invert the pair of output signals of the selector circuit 5 and furnish the inverted pair of outputs by way of the second pair of output terminals COL and COH. COH in FIG. 2 shows the value of one of the inverted pair of output signals that is furnished via the output terminal COH.

The first output of the selector circuit 5 that appears at the connecting point between the first and second N-channel transistors 5A and 5B is either one of the second pair of inputs applied to the input terminal IN2H or one of the fifth pair of inputs at the input terminal CINH, indicating the carry input, whereas the second output of the selector circuit 5 that appears at the connecting point between the third and fourth N-channel transistors 5C and 5D is either the other one of the second pair of inputs at the input terminal IN2L or the other one of the fifth pair of inputs at the input terminal CINL, indicating the carry input. The fourth inverter circuit 18 inverts the second output of the selector circuit 5 that appears at the connecting point between the third and fourth N-channel transistors 5C and 5D, and then furnishes the inverted result, which corresponds to either the one of the second pair of inputs at the input terminal IN2H or the one of the fifth pair of inputs at the input terminal CINH, by way of the output terminal COH. The third inverter circuit 17 inverts the first output of the selector circuit 5 that appears at the connecting point between the first and second N-channel transistors 5A and 5B, and then furnishes the inverted result, which corresponds to either the other one of the second pair of inputs at the input terminal IN2L or the other one of the fifth pair of inputs at the input terminal CINL, by way of the other output terminal COL. The second pair of output signals from the third and fourth inverter circuits 17 and 18 are thus complementary to each other. In other words, the third and fourth inverter circuits 17 and 18 substantially furnish the pair of output signals of the selector circuit 5 by way of the second pair of output terminals COH and COL, just as they are. It is apparent from the above description that the third and fourth inverter circuits 17 and 18 can be removed if the output terminals COL and COH are interchanged.

In this manner, the selector circuit 5 can select and furnish either the fifth pair of incoming signals, indicating the carry input, applied thereto by way of the fifth pair of input terminals CINH and CINL or the second pair of incoming signals applied thereto by way of the second pair of input terminals IN2H and IN2L, as the second pair of output signals indicating the second carry by way of the second pair of output terminals COH and COL, according to the logical exclusive OR of the logical exclusive OR of two of the four inputs and the logical exclusive OR of the remaining two of the four inputs. In other words, when the logical exclusive OR of the logical exclusive OR of any two of the four input values applied to the input terminals IN1H, IN2H, IN3H, and IN4H and the logical exclusive OR of the remaining two is logic 1, the selector circuit 5 sets the values of the second pair of output signals indicating the second carry to the values of the fifth pair of incoming signals, indicating the carry input, applied to the fifth pair of input terminals CINH and CINL. In contrast, when the logical exclusive OR of the logical exclusive OR of any two of the four input values applied to the input terminals IN1H, IN2H, IN3H, and IN4H and the logical exclusive OR of the remaining two is logic 0, the selector circuit 5 sets the values of the second pair of output signals indicating the second carry to the values of the second pair of incoming signals applied to the second pair of input terminals IN2H and IN2L.

When the carry generating circuit 14 receives the third and fourth pairs of complementary incoming signals, which have been applied to the third and fourth pairs of input terminals IN3H and IN3L, and IN4H and IN4L, respectively, and inverted or supplied thereto, just as they are, by the input value converting circuit 6, it calculates a first carry from the two pairs of incoming signals applied thereto via the input value converting circuit 6 and the first pair of incoming signals applied thereto via the first pair of input terminals IN1H and IN1L, and then furnishes a third pair of output signals indicating the first carry by way of the third pair of output terminals COTH and COTL. In other words, when the input terminal IN3H is at logic 1 and the input terminal IN4H is at logic 1, the first carry becomes logic 1. In contrast, when the input terminal IN3H is at logic 0 and the input terminal IN4H is at logic 0, the first carry becomes logic 0. Otherwise, the first carry has the same logical state as the input terminal IN1H. It is noted that the first carry is independent of the states of the second pair of input terminals IN2H and IN2L, as shown in FIG. 2. COTH of FIG. 2 shows the state of one of the third pair of outputs that is furnished by way of the output terminal COTH.

In this manner, the carry generating circuit 14 can calculate the first carry and then furnish the third pair of output signals indicating the first carry by way of the third pair of output terminals COTH and COTL.

As previously mentioned, in accordance with the first embodiment of the present invention, there is provided a 4-2 compressor circuit capable of inverting two pairs of incoming signals applied thereto by way of the third and fourth input terminals IN3H and IN3L, and IN4H and IN4L when an input at the input terminal IN3H is at logic 0 and an input at the input terminal IN4H is at logic 1, so as to reduce the number of varying combinations of the values of the four inputs. Accordingly, the first embodiment makes it possible to simplify the circuit structure for calculating the sum of the four inputs and the carry input from a neighboring 4-2 compressor, the circuit structure for calculating a first carry, and the circuit structure for calculating a second carry, and therefore speed up those calculations.

Since the values of partial products, which have been generated by for example a booth shifter, which will be described below, and are applied to the third and fourth pairs of input terminals IN3H and IN3L, and IN4H and IN4L, can be determined at an earlier time before the first and second pairs of incoming inputs from the preceding 4-2 compressor are applied to the first and second pairs of input terminals IN1H and IN1L, and IN2H and IN2L, there are no delays caused by the calculation conducted by the input value converting circuit 6.

Second Embodiment

Figure 3:
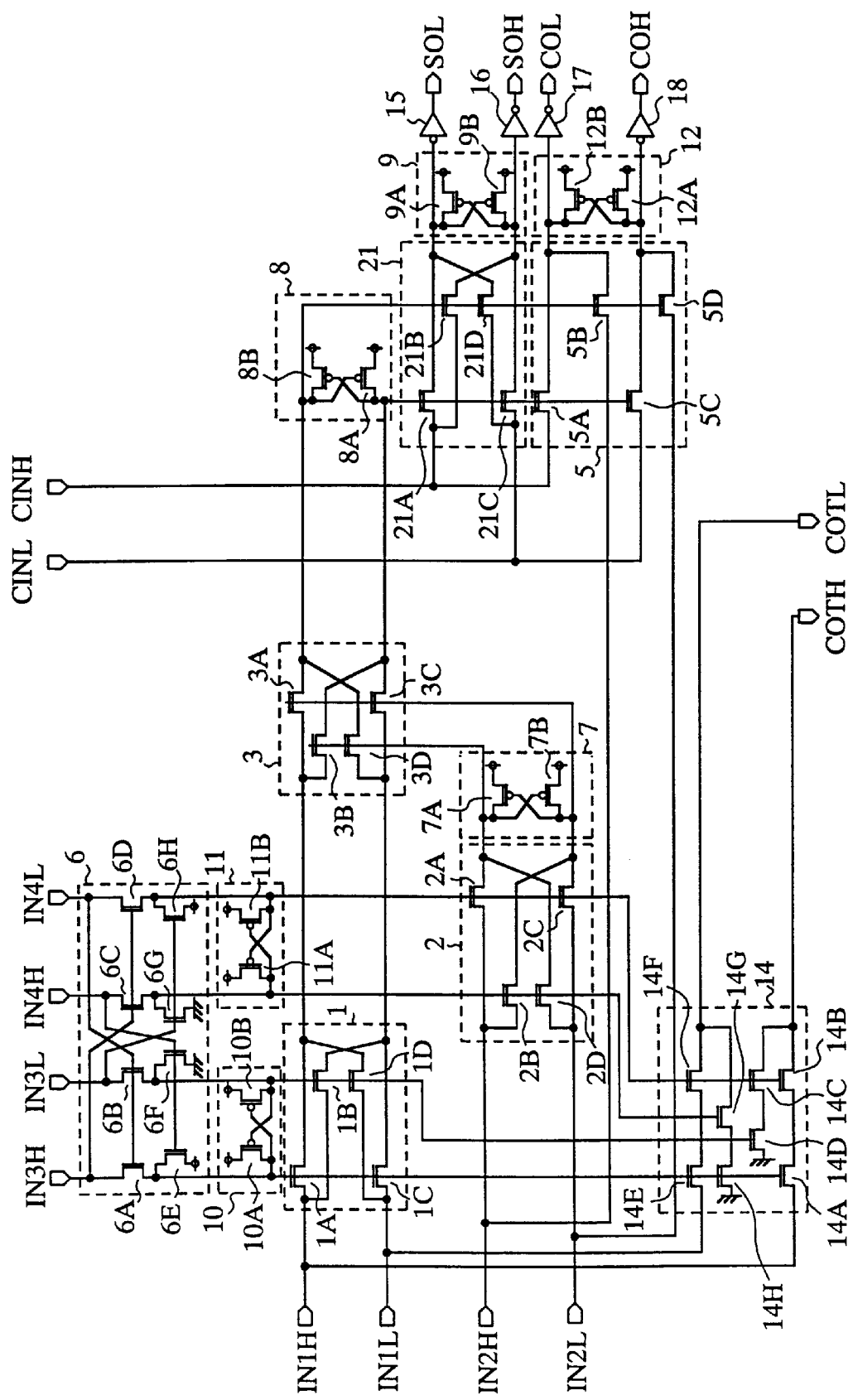
FIG. 3 is a schematic circuit diagram showing the structure of a 4-2 compressor circuit according to a second embodiment of the present invention.

Referring next to FIG. 3, there is illustrated a schematic circuit diagram showing the structure of a 4-2 compressor circuit according to a second embodiment of the present invention. The 4-2 compressor circuit according to the second embodiment does not include a voltage compensation circuit 13, unlike the first embodiment mentioned above. In addition, the 4-2 compressor circuit according to the second embodiment includes a fourth EXOR circuit 21 instead of the EXOR circuit 4 of FIG. 1, as shown in FIG. 3.

The fourth EXOR circuit 21 of the second embodiment is comprised of four N-channel transistors 21A to 21D, like a first EXOR circuit 1. The fourth EXOR circuit 21 receives a pair of complementary output signals from a third EXOR circuit 3 and then implements the logical exclusive OR operation on the pair of output signals and a fifth pair of complementary incoming signals indicating a carry input from a neighboring 4-2 compressor circuit, which are applied thereto by way of a fifth pair of input terminals CINH and CINL, respectively. The fourth EXOR circuit 21 then furnishes a pair of output signals indicating the logical exclusive OR implementation result indicating the sum of the carry input and the four inputs, which are applied to first through fourth pairs of input terminals IN1H and IN1L, IN2H and IN2L, IN3H and IN3L, and IN4H and IN4L, to first and second inverter circuits 15 and 16.

The first N-channel transistor 21A of the fourth EXOR circuit 21 has a gate terminal electrically connected to the third EXOR circuit 3 by way of a first signal line, a second terminal electrically connected to the input terminal CINH by way of a third signal line, and a third terminal electrically connected to the first inverter circuit 15 by way of a fifth signal line. The second N-channel transistor 21B has a gate terminal electrically connected to a second output of the third EXOR circuit 3 by way of a second signal line, a second terminal electrically connected to the input terminal CINH by way of the third signal line, and a third terminal electrically connected to the second inverter circuit 16 by way of a sixth signal line. The third N-channel transistor 21C has a gate terminal electrically connected to the first output of the third EXOR circuit 3 by way of the first signal line, a second terminal electrically connected to the input terminal CINL by way of a fourth signal line, and a third terminal electrically connected to the second inverter circuit 16 by way of the first signal line. The fourth N-channel transistor 21D has a gate terminal electrically connected to the second output of the third EXOR circuit 3 by way of the second signal line, a second terminal electrically connected to the input terminal CINL by way of the fourth signal line, and a third terminal electrically connected to the first inverter circuit 15 by way of the fifth signal line.

The other components of the 4-2 compressor circuit according to the second embodiment of the present invention are the same as those of the 4-2 compressor circuit according to the above-mentioned first embodiment, and therefore the description of those components will be omitted hereafter.

Figure 4:
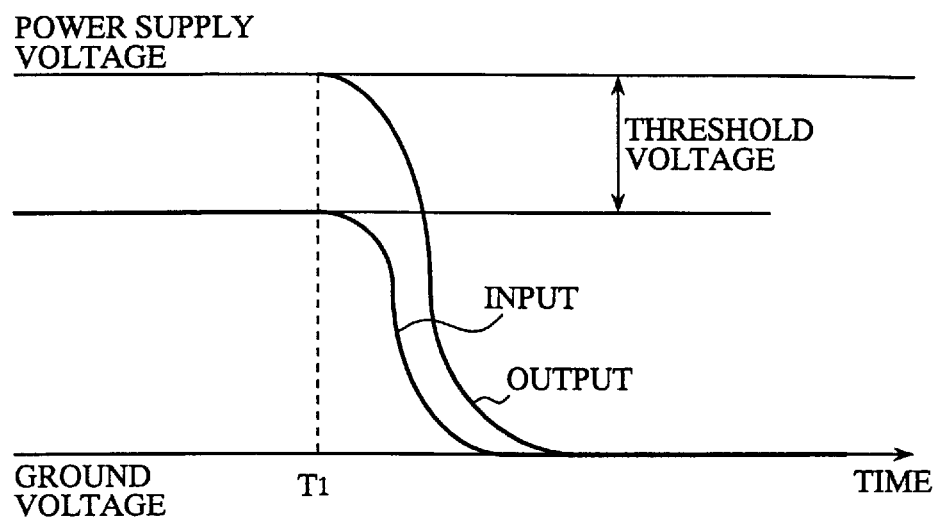
FIG. 4 is a diagram showing an example of a relationship between a change from the high state to the low state in one of a fifth pair of complementary incoming signals applied to a fourth EXOR circuit by way of a fifth pair of input terminals CINH and CINL (i.e. a pair of outputs from a carry generating circuit of a neighboring 4-2 compressor circuit), and a change from the high state to the low state in one of a pair of complementary output signals furnished by the fourth EXOR circuit.
Figure 5:
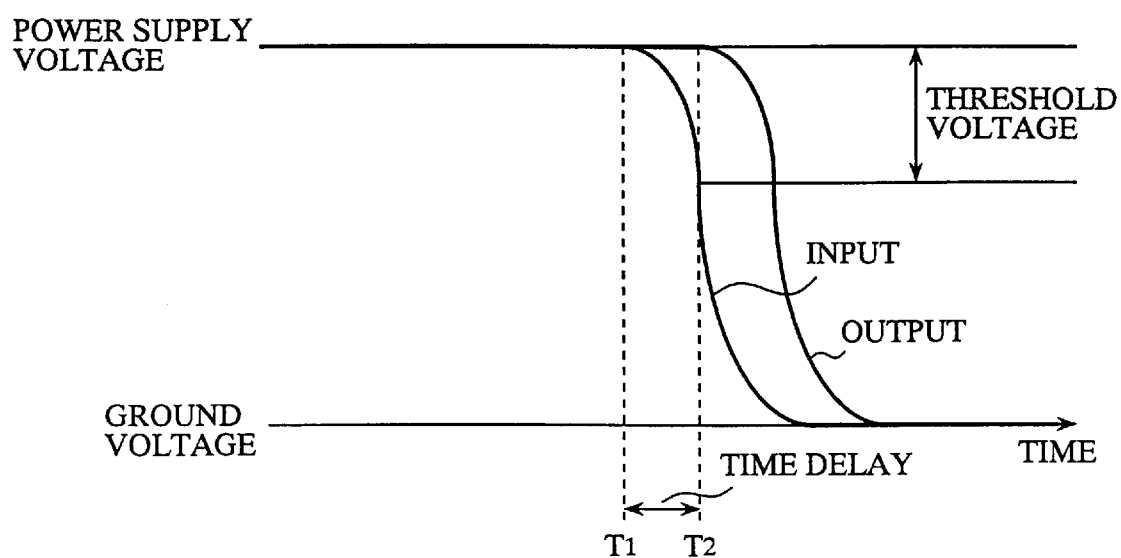
FIG. 5 is a diagram showing an example of a relationship between a change from the high state to the low state in one of the fifth pair of complementary incoming signals applied to the fourth EXOR circuit by way of the fifth pair of input terminals CINH and CINL (i.e. the pair of outputs from the carry generating circuit of the neighboring 4-2 compressor circuit), and a change from the high state to the low state in one of the pair of complementary output signals furnished by the fourth EXOR circuit, in case that a voltage compensation circuit is disposed on the output side of a carry generating circuit.

Referring next to FIG. 4, there is illustrated a diagram showing an example of a relationship between a change from the high state to the low state in one of the fifth pair of complementary incoming signals applied to the fourth EXOR circuit 21 by way of the fifth pair of input terminals CINH and CINL (i.e. a pair of outputs from the carry generating circuit 14 of a neighboring 4-2 compressor circuit), and a change from the high state to the low state in one of the pair of complementary output signals furnished by the fourth EXOR circuit 21. FIG. 5 shows an example of a relationship between a change from the high state to the low state in one of the fifth pair of complementary incoming signals applied to the fourth EXOR circuit 21 by way of the fifth pair of input terminals CINH and CINL (i.e. a pair of outputs from the carry generating circuit 14 of a neighboring 4-2 compressor circuit), and a change from the high state to the low state in one of the pair of complementary output signals furnished by the fourth EXOR circuit 21, in case that the voltage compensation circuit 13 is disposed on the output side of the carry generating circuit 14.

Since the 4-2 compressor circuit according to the second embodiment of the present invention does not include the voltage compensation circuit 13 in fact, unlike the first embodiment, the higher one of the voltages that appear at the fifth pair of input terminals CINH and CINL, which are electrically connected to the third output terminals COTH and COTL of a neighboring 4-2 compressor circuit, is not pulled up to the power supply voltage. The higher one of the voltages that appear at the fifth pair of input terminals CINH and CINL is reduced, by a threshold voltage between the gate and source of each of the first to fourth N-channel transistors 21A, 21B, 21C, and 21D of the fourth EXOR circuit 21, to a certain voltage from the power supply voltage, as shown in FIG. 4. In other words, since the fifth pair of input terminals CINH and CINL of the 4-2 compressor circuit are electrically connected to the third pair of output terminals COTH and COTL of another 4-2 compressor circuit, the higher one of the voltages of the fifth pair of complementary incoming signals indicating the carry input, i.e. first carry, transmitted between the output terminals COTH and COTL of the other 4-2 compressor circuit and the fifth pair of input terminals CINH and CINL of the 4-2 compressor circuit can be reduced, by a threshold voltage between the gate and source of each of the first to fourth N-channel transistors 21A, 21B, 21C, and 21D of the fourth EXOR circuit 21, to a certain voltage from the power supply voltage, to which a higher-voltage output of the fourth EXOR circuit 21 is pulled up by a voltage compensation circuit 9.

When the carry input makes a transition, the higher one of the voltages of the fifth pair of complementary incoming signals indicating the carry input, having a voltage reduced from the power supply voltage by a threshold voltage between the gate and source of each of the first to fourth N-channel transistors 21A, 21B, 21C, and 21D of the fourth EXOR circuit 21, is reduced to a ground voltage, as shown in FIG. 4. Therefore, either the first N-channel transistor 21A or the third N-channel transistor 21C of the fourth EXOR circuit 21 makes a transition from its OFF state to its ON state without delay after the transition in the carry input.

In case that the voltage compensation circuit 13 is disposed on the output side of the carry generating circuit 14, the higher one of the voltages of the fifth pair of complementary incoming signals indicating the carry input decreases from the power supply voltage to a ground voltage, as shown in FIG. 5. Therefore, there can be a delay between a change in the first carry from a neighboring 4-2 compressor circuit and a corresponding drop in the higher one of the voltages of the fifth pair of complementary signals indicating the carry input, below a certain level which is lower than the power supply voltage by the threshold voltage between the gate and source of each of the first and third N-channel transistors 21A and 21C, while either one of the first through fourth N-channel transistors 21A, 21B, 21C, and 21D of the fourth EXOR circuit 21. It is noted that the provision of the voltage compensation circuit 13 should generate such a delay in either one of the fifth pair of complementary incoming signals indicating the carry input when the corresponding first carry changes.

The other operations of the 4-2 compressor circuit according to the second embodiment are the same as those of the 4-2 compressor circuit of the first embodiment mentioned above, and the relationship between the inputs and the outputs of the 4-2 compressor circuit according to the second embodiment is the same as that of the first embodiment as shown in FIG. 2. Therefore, the description about the other operations and the relationship between the inputs and the outputs of the 4-2 compressor will be omitted hereafter.

As previously mentioned, in accordance with the second embodiment of the present invention, the higher one of the voltages that appear at the fifth pair of input terminals CINH and CINL, which can be electrically connected to the third pair of output terminals COTH and COTL of another 4-2 compressor circuit, is not pulled up to the power supply voltage and is reduced, by a threshold voltage between the gate and source of each of the first to fourth N-channel transistors 21A, 21B, 21C, and 21D of the fourth EXOR circuit 21, to a certain voltage from the power supply voltage. As a result, a delay in the switching of each of those N-channel transistors can be reduced and the computational speed of the 4-2 compressor circuit can be therefore improved.

Third Embodiment

Figure 6:
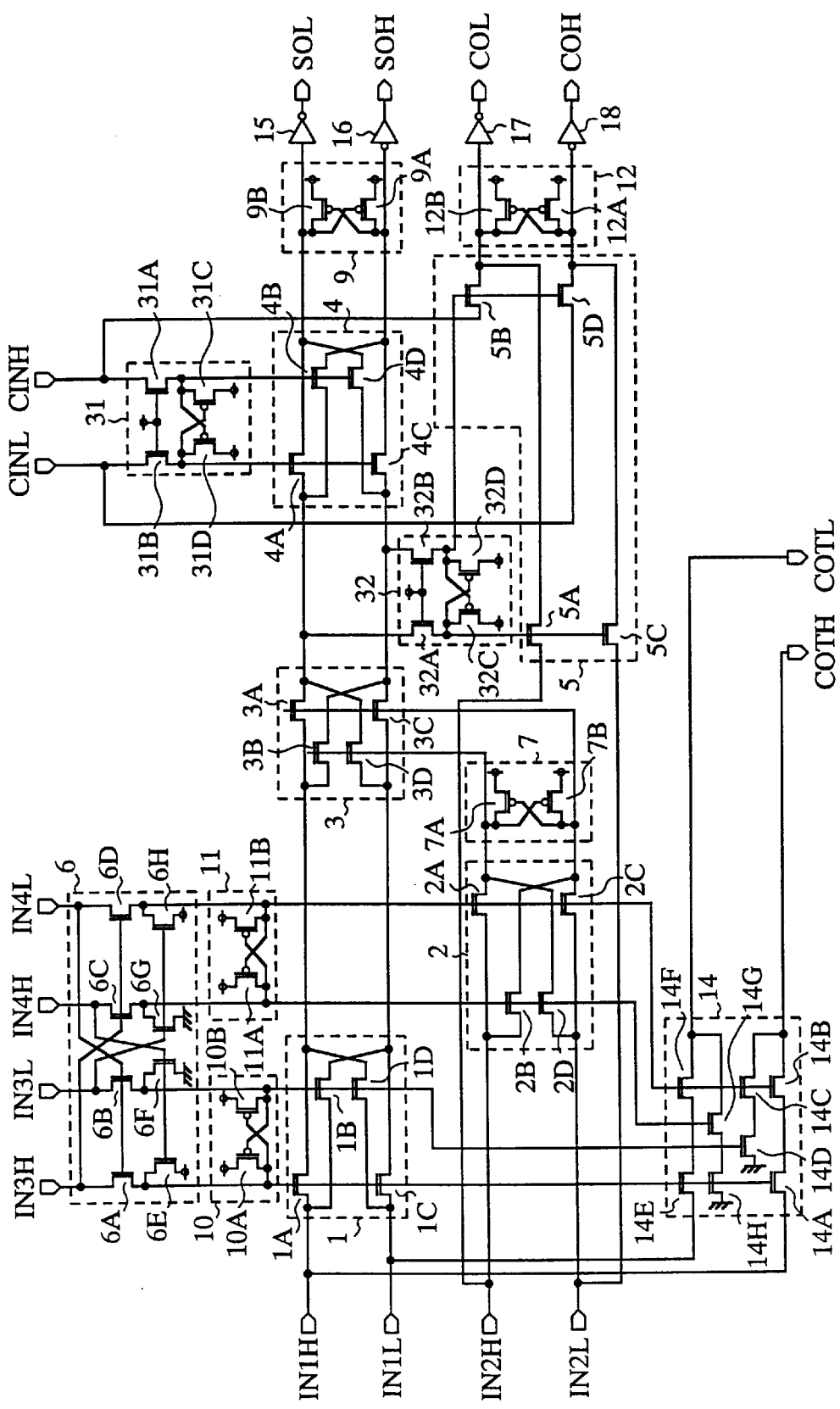
FIG. 6 is a schematic circuit diagram showing the structure of a 4-2 compressor circuit according to a third embodiment of the present invention.

Referring next to FIG. 6, there is illustrated a schematic circuit diagram showing the structure of a 4-2 compressor circuit according to a third embodiment of the present invention. Unlike the 4-2 compressor circuit of the above-mentioned first embodiment, the 4-2 compressor circuit of the third embodiment does not include voltage compensation circuits 8 and 13. Instead, the 4-2 compressor circuit of the third embodiment comprises voltage separation circuits (voltage holding circuits) 31 and 32.

The first voltage separation circuit 31 is disposed between a fifth pair of input terminals CINH and CINL and a fourth EXOR circuit 4, for pulling up a higher-voltage one of a pair of its outputs electrically connected to the fourth EXOR circuit 4 to a power supply voltage without pulling up a higher-voltage one of a pair of its inputs electrically connected to the fifth pair of input terminals CINH and CINL. As shown in FIG. 6, the input terminal CINH is directly connected to the second terminal of the second N-channel transistor 5B of a selector 5, and the input terminal CINL is directly connected to the fourth N-channel transistor 5D of the selector 5.

The voltage separation circuit 31 includes a first N-channel transistor 31A having a gate terminal electrically connected to the power supply, a second terminal electrically connected to the input terminal CINH, and a third terminal electrically connected to the gate terminals of the second and fourth N-channel transistors 4B and 4D of the fourth EXOR circuit 4; a second N-channel transistor 31B having a gate terminal electrically connected to the power supply, a second terminal electrically connected to the input terminal CINL, and a third terminal electrically connected to the gate terminals of the first and third N-channel transistors 4A and 4C of the fourth EXOR circuit 4; a first P-channel transistor 31C having a gate terminal electrically connected to the third terminal of the second N-channel transistor 31B, a source terminal electrically connected to a power supply, and a drain terminal electrically connected to the third terminal of the first N-channel transistor 31A; a second P-channel transistor 31D having a gate terminal electrically connected to the drain terminal of the first P-channel transistor 31C, a source terminal electrically connected to a power supply, and a drain terminal electrically connected to the gate terminal of the first P-channel transistor 31C. The pair of P-channel transistors 31C and 31D constructs a voltage compensation circuit similar to a voltage compensation circuit 7 as shown in FIG. 6. The voltage separation circuit 31 thus pulls up a higher-voltage one of a pair of signal lines electrically connected to the gate terminals of the N-channel transistors 4A and 4C of the fourth EXOR circuit 4 and the gate terminals of the remaining N-channel transistors 4B and 4D of the fourth EXOR circuit 4 to the power supply voltage, and also holds a higher-voltage one of another pair of signal lines connected to the second terminals of the second and fourth N-channel transistors 5B and 5D of the selector 5 at a certain voltage that is lower than the power supply voltage by the threshold voltage between the gate and source of each of the N-channel transistors.

Like the first voltage separation circuit 31, the second voltage separation circuit 32 is disposed between the pair of outputs of a third EXOR circuit 3 and a selector circuit 5, for pulling up a higher-voltage one of a pair of its outputs electrically connected to the selector circuit 5 to a power supply voltage without pulling up a higher-voltage one of a pair of its inputs electrically connected to the pair of outputs of the third EXOR circuit 3. One of the pair of outputs of the second voltage separation circuit 32 is electrically connected to the gate terminals of the first and third N-channel transistors 5A and 5C of the selector circuit 5, whereas the other one of the pair of outputs of the second voltage separation circuit 32 is electrically connected to the gate terminals of the second and fourth N-channel transistors 5B and 5D of the selector circuit 5. The second voltage separation circuit 32 thus pulls up a higher-voltage one of a pair of signal lines electrically connected to the gate terminals of the N-channel transistors 5A and 5C of the selector 5 and the gate terminals of the remaining N-channel transistors 5B and 5D of the selector 5 to the power supply voltage, and also holds a higher-voltage one of another pair of signal lines connected to the second terminals of the first and third N-channel transistors 4A and 4C of the fourth EXOR circuit 4 at a certain voltage that is lower than the power supply voltage by the threshold voltage between the gate and source of each of the N-channel transistors.

The other components of the 4-2 compressor circuit according to the third embodiment of the present invention are the same as those of the above-mentioned first embodiment and therefore the description of the other components will be hereafter omitted.

As previously explained, the 4-2 compressor circuit according to the third embodiment of the present invention is provided with the first and second voltage separation circuits 31 and 32, instead of the voltage compensation circuits 8 and 13, unlike the 4-2 compressor circuit of the first embodiment mentioned above. Accordingly, neither of the higher-voltage one of the pair of output signals transmitted from the third EXOR circuit 3 to the fourth EXOR circuit 4 and the higher-voltage one of the fifth pair of incoming signals transmitted from the fifth pair of input terminals CINH and CINL to the selector circuit 5 is pulled up to the power supply voltage. As a result, both a time delay in transition caused when the pair of outputs of the third EXOR circuit changes and a time delay in transition caused when the carry input furnished to the selector circuit 5 changes can be reduced.

The other operations of the 4-2 compressor circuit of the third embodiment are the same as those of the 4-2 compressor circuit of the first embodiment mentioned above, and the relationship between the inputs and the outputs of the 4-2 compressor circuit according to the third embodiment is the same as that of the first embodiment as shown in FIG. 2. Therefore, the description about the other operations and the relationship between the inputs and the outputs of the 4-2 compressor circuit will be omitted hereafter.

As previously mentioned, in accordance with the third embodiment of the present invention, there are provided the first voltage separation circuit 31 disposed at the gate input of the fourth EXOR circuit 4, for pulling up the higher-voltage one of the pair of its outputs to the power supply voltage without pulling up the higher-voltage one of the pair of its inputs, and the second voltage separation circuit 32 disposed at the gate input of the selector circuit 5, for pulling up the higher-voltage one of the pair of its outputs to the power supply voltage without pulling up the higher-voltage one of the pair of its inputs. Accordingly, the higher-voltage one of the pair of signals input to the fourth EXOR circuit 4 other than the pair of gate inputs is not pulled up to the power supply voltage. Similarly, the higher-voltage one of the pair of signals input to the selector circuit 5 other than the pair of gate inputs is not pulled up to the power supply voltage. As a result, a delay in the switching of each of the N-channel transistors included either of the fourth EXOR circuit 4 and the selector circuit 5 can be reduced and the computational speed of the 4-2 compressor circuit can be therefore improved.

Fourth Embodiment

Figure 7:
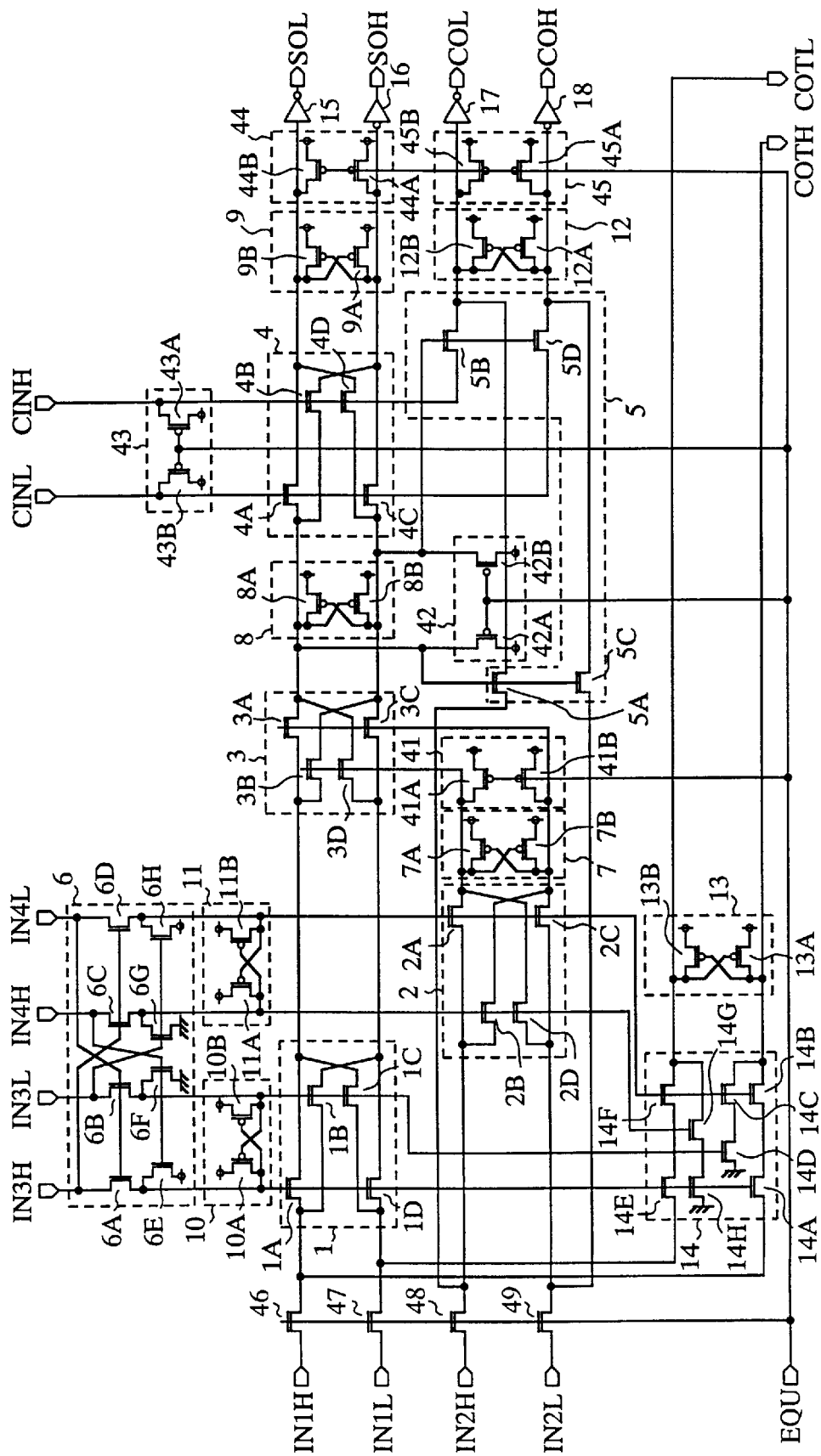
FIG. 7 is a schematic circuit diagram showing the structure of a 4-2 compressor circuit according to a fourth embodiment of the present invention.

Referring next to FIG. 7, there is illustrated a schematic circuit diagram showing the structure of a 4-2 compressor circuit according to a fourth embodiment of the present invention. In addition to all the components of the 4-2 compressor circuit of the first embodiment as shown in FIG. 1, the 4-2 compressor of the fourth embodiment further comprises a plurality of precharge circuits 41 to 45 and a plurality of N-channel transistors 46 to 49.

The first precharge circuit 41 is disposed between a pair of signal lines electrically connected to the pair of outputs of a second EXOR circuit 2, for precharging the pair of outputs of the second EXOR circuit 2 so that they have a power supply voltage when a precharge input applied to a precharge input terminal EQU is at logic 0. The first precharge circuit 41 is provided with a first P-channel transistor 41A having a gate terminal electrically connected to the precharge input terminal EQU, a second terminal electrically connected to a power supply, and a third terminal electrically connected to one of the pair of outputs of the second EXOR circuit 2, and a second P-channel transistor 41B having a gate terminal electrically connected to the precharge input terminal EQU, a second terminal electrically connected to a power supply, and a third terminal electrically connected to the other one of the pair of outputs of the second EXOR circuit 2.

Like the first precharge circuit 41, the second precharge circuit 42 is comprised of two P-channel transistors 42A and 42b and is disposed between the pair of outputs of a third EXOR circuit 3, for precharging a pair of signal lines electrically connected to the pair of outputs of a third EXOR circuit 3 so that they have a power supply voltage when the precharge input applied to the precharge input terminal EQU is at logic 0. Like the first precharge circuit 41, the third precharge circuit 43 is comprised of two P-channel transistors 43A and 43B and is disposed between a pair of signal lines extending from a fifth pair of input terminals CINH and CINL to a fourth EXOR circuit 4, for precharging the pair of signal lines so that they have a power supply voltage when the precharge input applied to the precharge input terminal EQU is at logic 0.

Like the first precharge circuit 41, the fourth precharge circuit 44 is comprised of two P-channel transistors 44A and 44B and is disposed between a pair of signal lines electrically connected to the pair of outputs of a fourth EXOR circuit 4, for precharging the pair of signal lines so that they have a power supply voltage when the precharge input applied to the precharge input terminal EQU is at logic 0. Like the first precharge circuit 41, the fifth precharge circuit 45 is comprised of two P-channel transistors 45A and 45B and is disposed between a pair of signal lines electrically connected to the pair of outputs of a selector circuit 5, for precharging the pair of signal lines so that they have a power supply voltage when the precharge input applied to the precharge input terminal EQU is at logic 0.

The N-channel transistor 46 has a gate terminal electrically connected to the precharge input terminal EQU, a second terminal electrically connected to the input terminal IN1H, and a third terminal electrically connected to the first and second N-channel transistors 1A and 1B of a first EXOR circuit 1 and the first N-channel transistor 14A of a carry generating circuit 14. The N-channel transistor 47 has a gate terminal electrically connected to the precharge input terminal EQU, a second terminal electrically connected to the input terminal IN1L, and a third terminal electrically connected to the third and fourth N-channel transistors 1C and 1D of the first EXOR circuit 1 and the fifth N-channel transistor 14E of the carry generating circuit 14.

The N-channel transistor 48 has a gate terminal electrically connected to the precharge input terminal EQU, a second terminal electrically connected to the input terminal IN2H, and a third terminal electrically connected to the first and second N-channel transistors 2A and 2B of the second EXOR circuit 2 and the first N-channel transistor 5A of the selector circuit 5. The N-channel transistor 49 has a gate terminal electrically connected to the precharge input terminal EQU, a second terminal electrically connected to the input terminal IN2L, and a third terminal electrically connected to the third and fourth N-channel transistors 2C and 2D of the second EXOR circuit 2 and the third N-channel transistor 5C of the selector circuit 5.

The other components of the 4-2 compressor circuit according to the fourth embodiment of the present invention are the same as those of the 4-2 compressor circuit of the first embodiment mentioned above, and therefore the description about the other components will be omitted hereafter.

In an initial state, the precharge input at logic 0 can be applied to both the plurality of precharge circuits 41 to 45 and the plurality of N-channel transistors 46 to 49 by way of the precharge input terminal EQU. Then the pair of outputs of each of the second through fourth EXOR circuits 2 to 4 and the selector circuit 5, and the pair of signal lines, through which the carry input is transmitted, extending from the fifth pair of input terminals CINH and CINL to the fourth EXOR circuit 4 are precharged up to the power supply voltage. In this case, while a pair of signals at logic 0 are furnished as the result of the summation of four inputs, by way of the first pair of output terminals SOH and SOL, to the first pair of input terminals INLH and INIL of a neighboring 4-2 compressor circuit, another pair of signals at logic 0 are furnished as a second carry, by way of the second pair of output terminals COH and COL, to the second pair of input terminals IN2H and IN2L of the neighboring 4-2 compressor circuit. Since the plurality of N-channel transistors 46 to 49 of the neighboring 4-2 compressor circuit are held in their OFF state, those signals at logic 0 are not transmitted to the first and second EXOR circuits 1 and 2, the selector circuit 5, and the carry generating circuit 14 of the neighboring 4-2 compressor circuit. Thus no problem arises.

The precharge input can make a transition from logic 0 to logic 1 immediately before first and second pairs of input signals are applied to the 4-2 compressor circuit by way of the first and second pairs of input terminals IN1H and IN1L, and IN2H and IN2L. For example, a given circuit not shown causes the precharge input to make a transition from logic 0 to logic 1 at a time when the neighboring 4-2 compressor at the preceding stage, which is electrically connected to the first and second pairs of input terminals IN1H and IN1L, and IN2H and IN2L, starts performing calculations. Then, when first and second pairs of input signals are applied to the 4-2 compressor circuit by way of the first and second pairs of input terminals IN1H and IN1L, and IN2H and IN2L, the precharged voltage of one of the pair of signal lines electrically connected to the pair of outputs of each of the second through fourth EXOR circuits 2 to 4 and the selector circuit 5 can change from the power supply voltage to the ground voltage according to the values of the pair of incoming signals applied thereto. Similarly, the precharged voltage of one of the pair of signal lines extending from the fifth pair of input terminals CINH and CINL to the fourth EXOR circuit 4 can change from the power supply voltage to the ground voltage according to the values of the pair of incoming signals applied thereto.

After that, the 4-2 compressor circuit according to the fourth embodiment of the present invention operates in the same manner as the first embodiment mentioned above. Furthermore, the relationship between the inputs and the outputs of the 4-2 compressor circuit according to the fourth embodiment is the same as that of the first embodiment as shown in FIG. 2. Therefore, the description of the subsequent operation of the 4-2 compressor circuit and the relationship between the inputs and the outputs of the 4-2 compressor circuit will be omitted hereafter.

As previously mentioned, in accordance with the fourth embodiment of the present invention, the pair of signal lines electrically connected to the pair of outputs of each of the second through fourth EXOR circuits 2 to 4 and the selector circuit 5, and the pair of signal lines extending from the fifth pair of input terminals CINH and CINL to the fourth EXOR circuit 4 can be precharged up to the power supply voltage, immediately before the first and second pairs of input signals are applied to the 4-2 compressor by way of the first and second pairs of input terminals IN1H and IN1L, and IN2H and IN2L. Then, when the 4-2 compressor circuit receives the first and second pairs of incoming signals by way of the first and second pairs of input terminals IN1H and IN1L, and IN2H and IN2L, respectively, the precharged voltage of one of the pair of signal lines electrically connected to the pair of outputs of each of the plurality of EXOR circuits 2 to 4 and the selector circuit 5, and the precharged voltage of one of the pair of signal lines extending from the fifth pair of input terminals CINH and CINL to the fourth EXOR circuit 4 can change from the power supply voltage to the ground voltage according to the values of those input signals. Accordingly, in the pair of signal lines electrically connected to the pair of outputs of each of the plurality of EXOR circuits 2 to 4 and the selector circuit 5, and the pair of signal lines extending from the fifth pair of input terminals CINH and CINL to the fourth EXOR circuit 4, no change from the ground voltage to the power supply voltage which requires a comparatively long time period occurs. This results in reducing the time required for the values of the pair of outputs of each of the plurality of EXOR circuits 2 to 4 and the selector circuit 5, and the values of the pair of signal lines extending from the fifth pair of input terminals CINH and CINL to the fourth EXOR circuit 4 to make stable.

The precharged voltage is not limited to the power supply voltage. For example, in a variant, the pair of signal lines electrically connected to the pair of outputs of each of the second through fourth EXOR circuits 2 to 4 and the selector circuit 5, and the pair of signal lines extending from the fifth pair of input terminals CINH and CINL to the fourth EXOR circuit 4 can be precharged up to a voltage intermediate between the power supply voltage and the ground voltage. In this case, one of each of the plurality of pairs of signal lines can change from the intermediate voltage to the power supply voltage, while the other one of the plurality of pairs of signal lines can change from the intermediate voltage to the ground voltage. This results in reducing the time required for the values of the pair of outputs of each of the second through fourth EXOR circuits 2 to 4 and the selector circuit 5, and the values of the pair of signal lines extending from the fifth pair of input terminals CINH and CINL to the fourth EXOR circuit 4 to make stable.

Fifth Embodiment

Figure 8:
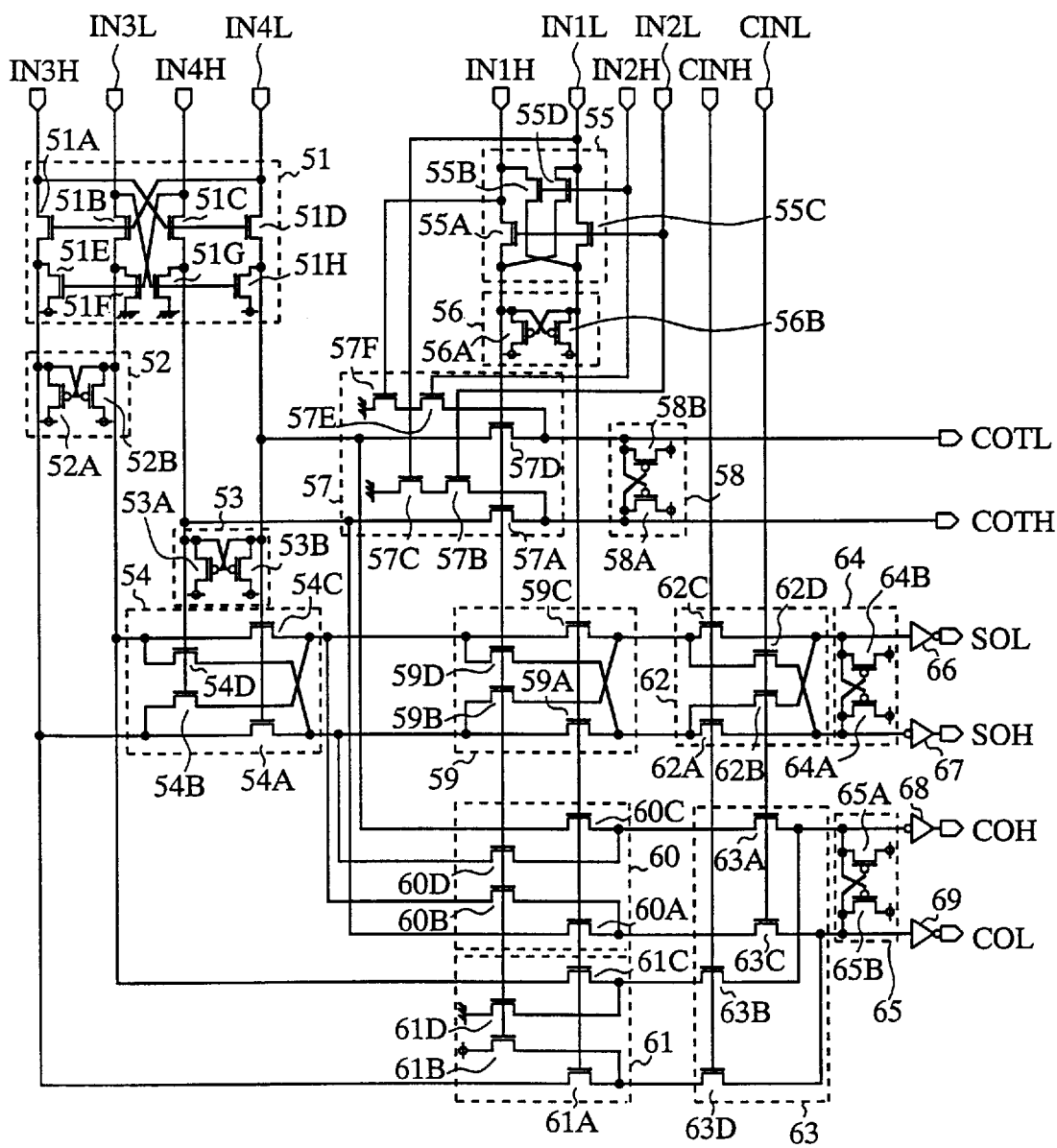
FIG. 8 is a schematic circuit diagram showing the structure of a 4-2 compressor circuit according to a fifth embodiment of the present invention.

Referring next to FIG. 8, there is illustrated a schematic circuit diagram showing the structure of a 4-2 compressor circuit according to a fifth embodiment of the present invention. In the figure, reference numeral 51 denotes an input value converting circuit comprised of first through eighth N-channel transistors 51A to 51H, like the input value converting circuit 6 of the first embodiment mentioned above, for, when one of a third pair of incoming signals applied to one of a third pair of input terminals IN3H is at logic 0 and one of a fourth pair of incoming signals applied to one of a fourth pair of input terminals IN4H is at logic 1, inverting the third and fourth pairs of incoming signals, and then furnishing the inverted third pair of incoming signals applied thereto by way of the third pair of input terminals IN3H and IN3L to both a first EXOR circuit 54 and a second selector circuit 61, and the inverted fourth pair of incoming signals applied thereto by way of the fourth pair of input terminals IN4H and IN4L to the first EXOR circuit 54, a carry generating circuit 57, and a first selector circuit 60. In contrast, when either the one of the third pair of incoming signals applied to the input terminal IN3H is not at logic 0 or the one of the fourth pair of incoming signals applied to the input terminal IN4H is not at logic 1, the input value converting circuit 51 furnishes the third pair of incoming signals applied thereto by way of the third pair of input terminals IN3H and IN3L to both the first EXOR circuit 54 and the second selector circuit 61, just as they are, and the fourth pair of incoming signals applied thereto by way of the fourth pair of input terminals IN4H and IN4L to the first EXOR circuit 54, the carry generating circuit 57, and the first selector circuit 60, just as they are.

Like the first EXOR circuit 1 of the 4-2 compressor circuit according to the above-mentioned first embodiment, the first EXOR circuit 54 is comprised of first to fourth N-channel transistors 54A to 54D. The first EXOR circuit 54 can receive both the third pair of complementary incoming signals, which have been applied to the input value converting circuit 51 by way of the third pair of input terminals IN3H and IN3L, and which is either inverted or furnished thereto, just as they are, by the input value converting circuit 51, and the fourth pair of complementary incoming signals, which have been applied to the input value converting circuit 51 by way of the fourth pair of input terminals IN4H and IN4L, and which is either inverted or furnished thereto, just as they are, by the input value converting circuit 51. The first EXOR circuit 54 then implements the logical exclusive OR operation on the third and fourth pairs of complementary incoming signals, respectively, and furnishes a pair of complementary output signals indicating the logical exclusive OR implementation result to both a third EXOR circuit 59 and the first selector 60.

A second EXOR circuit 55 is comprised of four N-channel transistors 55A to 55D, like the first EXOR circuit 54. The second EXOR circuit 55 can receive both a first pair of complementary incoming signals by way of a first pair of input terminals IN1H and IN1L, and a second pair of complementary incoming signals by way of a second pair of input terminals IN2H and IN2L. The second EXOR circuit 55 then implements the logical exclusive OR operation on the first and second pairs of complementary incoming signals, respectively, and furnishes a pair of complementary output signals indicating the logical exclusive OR implementation result to the carry generating circuit 57, the third EXOR circuit 59, the first selector circuit 60, and the second selector circuit 61.

Like the first EXOR circuit 54, the third EXOR circuit 59 is comprised of four N-channel transistors 59A to 59D. The third EXOR circuit 59 implements the logical exclusive OR operation on the pair of complementary output signals of the first EXOR circuit 54 and the pair of complementary output signals of the second EXOR circuit 55. The third EXOR circuit 59 then furnishes a pair of complementary output signals indicating the logical exclusive OR implementation result to a fourth EXOR circuit 62.

Like the first EXOR circuit 54, the fourth EXOR circuit 62 is comprised of four N-channel transistors 62A to 62D. The fourth EXOR circuit 62 implements the logical exclusive OR operation on the pair of complementary output signals of the third EXOR circuit 59 and a fifth pair of complementary incoming signals indicating a carry input from a neighboring 4-2 compressor circuit, which are applied thereto by way of a fifth pair of input terminals CINH and CINL. The fourth EXOR circuit 62 then furnishes a pair of complementary output signals indicating the logical exclusive OR implementation result to first and second inverter circuits 66 and 67.

The carry generating circuit 57 can receive the fourth pair of complementary incoming signals, which have been applied to the input value converting circuit 51 by way of the fourth pair of input terminals IN4H and IN4L, and which is either inverted or furnished thereto, just as they are, by the input value converting circuit 51. The carry generating circuit 57 then calculates a first carry from the fourth pair of complementary incoming signals, one of the pair of outputs of the second EXOR circuit 55, the first pair of complementary incoming signals applied thereto by way of the first pair of input terminals IN1H and IN1L, and the second pair of complementary incoming signals applied thereto by way of the second pair of input terminals IN2H and IN2L, and furnishes a pair of complementary output signals indicating the first carry by way of a third pair of output terminals COTH and COTL.

The carry generating circuit 57 includes a first N-channel transistor 57A having a gate terminal electrically connected to the first and fourth N-channel transistor 55A and 55D of the second EXOR circuit 55, a second terminal electrically connected to the third N-channel transistor 51C of the input value converting circuit 51, and a third terminal electrically connected to the output terminal COTH; a second N-channel transistor 57B having a gate terminal electrically connected to the input terminal IN2L, a second terminal electrically connected to a third N-channel transistor 57C, and a third terminal electrically connected to the output terminal COTH; the third N-channel transistor 57C having a gate terminal electrically connected to the input terminal IN1L, a second terminal electrically connected to a ground, and a third terminal electrically connected to the second N-channel transistor 57B; a fourth N-channel transistor 57D having a gate terminal electrically connected to the first and fourth N-channel transistors 55A and 55D of the second EXOR circuit 55, a second terminal electrically connected to the fourth N-channel transistor 51D of the input value converting circuit 51, and a third terminal electrically connected to the output terminal COTL; a fifth N-channel transistor 57E having a gate terminal electrically connected to the input terminal IN2H, a second terminal electrically connected to a sixth N-channel transistor 57F, and a third terminal electrically connected to the output terminal COTL; and the sixth N-channel transistor 57F having a gate terminal electrically connected to the input terminal IN1H, a second terminal electrically connected to a ground, and a third terminal electrically connected to the fifth N-channel transistor 57E.

Like the selector circuit 5 of the 4-2 compressor circuit according to the above-mentioned first embodiment, the first selector circuit 60 is comprised of four N-channel transistors 60A to 60D. The first selector circuit 60 can select either the fourth pair of complementary incoming signals, which have been applied to the input value converting circuit 51 by way of the fourth pair of input terminals IN4H and IN4L, and which is either inverted or furnished thereto, just as they are, by the input value converting circuit 51, or the pair of complementary output signals of the first EXOR circuit 54, according to the values of the pair of complementary output signals of the second EXOR circuit 55, and furnish the selected pair of complementary signals to a third selector circuit 63.

Like the first selector circuit 60, the second selector circuit 61 is comprised of four N-channel transistors 61A to 61D. The second selector circuit 61 can select either the third pair of complementary incoming signals, which have been applied to the input value converting circuit 51 by way of the third pair of input terminals IN3H and IN3L, and which is either inverted or furnished thereto, just as they are, by the input value converting circuit 51, or a pair of complementary signals indicating a certain value, according to the values of the pair of complementary output signals of the second EXOR circuit 55, and furnish the selected pair of complementary signals to the third selector circuit 63.

Like the first selector circuit 60, the third selector circuit 63 is comprised of four N-channel transistors 63A to 63D. The third selector circuit 63 can select either the pair of complementary output signals of the first selector circuit 60 or the pair of complementary output signals of the second selector circuit 61, according to the values of the fifth pair of complementary incoming signals indicating the carry input from a neighboring 4-2 compressor circuit, which are applied thereto by way of the fifth pair of input terminals CINH and CINL, and furnish the selected pair of complementary signals to third and fourth inverter circuits 68 and 69.

In FIG. 8, reference numerals 52, 53, 58, 64 and 65 denote voltage compensation circuits constructed in the same manner as the voltage compensation circuit 7 of the 4-2 compressor circuit according to the above-mentioned first embodiment, and disposed at the respective outputs of the input value converting circuit 51, the carry signal generating circuit 57, the fourth EXOR circuit 62, and the third selector circuit 63.

The first inverter circuit 66, which is electrically connected to both the second and third N-channel transistors 62B and 62C of the fourth EXOR circuit 62, inverts one of the pair of outputs of the fourth EXOR circuit 62 and then furnishes the inverted output as one of a first pair of complementary output signals indicating the sum of the carry input and the other four inputs by way of the output terminal SOL. The second inverter circuit 67, which is electrically connected to both the first and fourth N-channel transistors 62A and 62D of the fourth EXOR circuit 62, inverts the other one of the pair of outputs of the fourth EXOR circuit 62 and then furnishes the inverted other output as the other one of the first pair of complementary output signals indicating the sum of the carry input and the other four inputs by way of the output terminal SOH.

The third inverter circuit 68, which is electrically connected to both the first and second N-channel transistors 63A and 63B of the third selector circuit 63, inverts one of the pair of outputs of the third selector circuit 63 and then furnishes the inverted output as one of a second pair of complementary output signals indicating a second carry by way of the output terminal COH. The fourth inverter circuit 69, which is electrically connected to both the third and fourth N-channel transistors 63C and 63D of the third selector circuit 63, inverts the other one of the pair of outputs of the third selector circuit 63 and then furnishes the inverted other output as the other one of the second pair of complementary output signals indicating the second carry by way of the output terminal COL.

In general, when constructing a multiplier using a plurality of 4-2 compressors, the connection between two neighboring 4-2 compressors arranged in a direction with respect to bits of a multiplicand can be established by connecting the output terminals COTH and COTL of one of them with the input terminals CINH and CINL of the other one, respectively, for example. Similarly, the connection between two neighboring 4-2 compressors arranged in a direction with respect to bits of a multiplier can be established by connecting the output terminals SOH and SOL, and COH and COL of one of them with the input terminals IN1H and IN1L, and IN2H and IN2L of the other one, respectively, for example.

Referring next to FIG. 9, there is illustrated a table showing a relationship between the values of inputs and those of outputs of the 4-2 compressor circuit according to the fifth embodiment of the present invention. As shown in FIG. 9, when an input at the input terminal IN3H, which is one of the third pair of complementary incoming signals applied by way of the third pair of input terminals IN3H and IN3L, is at logic 0, and an input at the input terminal IN4H, which is one of the fourth pair of complementary incoming signals applied by way of the fourth pair of input terminals IN4H and IN4L, is at logic 1, the input value converting circuit 51 inverts the third and fourth pairs of complementary incoming signals. The input value converting circuit 51 then furnishes the inverted value IN3H' (shown in FIG. 9) of one of the third pair of incoming signals applied thereto by way of the third pair of input terminals IN3H and IN3L to both the first EXOR circuit 54 and the second selector circuit 61, and the inverted value IN4H' (shown in FIG. 9) of one of the fourth pair of incoming signals applied thereto by way of the fourth pair of input terminals IN4H and IN4L to the first EXOR circuit 54, the carry generating circuit 57, and the first selector circuit 60. In contrast, when either the input at the input terminal IN3H is not at logic 0 or the other input at the input terminal IN4H is not at logic 1, the input value converting circuit 51 furnishes the third pair of incoming signals applied thereto by way of the third pair of input terminals IN3H and IN3L to both the first EXOR circuit 54 and the second selector circuit 61, just as they are, and the fourth pair of incoming signals applied thereto by way of the fourth pair of input terminals IN4H and IN4L to the first EXOR circuit 54, the carry generating circuit 57, and the first selector circuit 60, just as they are.

When the first EXOR circuit 54 receives the third pair of complementary incoming signals, which have been applied to the third pair of input terminals IN3H and IN3L and which are inverted or supplied thereto, just as they are, by the input value converting circuit 51, and the fourth pair of complementary incoming signals, which have been applied to the fourth pair of input terminals IN3H and IN3L and which are inverted or supplied thereto, just as they are, by the input value converting circuit 51, it implements the logical exclusive OR operation on those two pairs of complementary incoming signals, respectively, and then furnishes a pair of output signals indicating the logical exclusive OR implementation result to both the third EXOR circuit 59 and the first selector circuit 60. Reference character A in FIG. 9 shows one of the pair of output signals of the first EXOR circuit 54, which appears at the connecting point between the second and third N-channel transistors 54B and 54C.

The second EXOR circuit 55 implements the logical exclusive OR operation on the first pair of incoming signals applied thereto by way of the first pair of input terminals IN1H and IN1L and the second pair of incoming signals applied thereto by way of the second pair of input terminals IN2H and IN2L, respectively, and then furnishes a pair of output signals indicating the logical exclusive OR implementation result to the carry generating circuit 57, the third EXOR circuit 59, and the first and second selector circuits 60 and 61.

The third EXOR circuit 59 then implements the logical exclusive OR operation on the pair of output signals of the first EXOR circuit 54 and the pair of output signals of the second EXOR circuit 55, respectively, and furnishes a pair of output signals indicating the logical exclusive OR implementation result to the fourth EXOR circuit 62. After that, the fourth EXOR circuit 62 implements the logical exclusive OR operation on the pair of output signals of the third EXOR circuit 59 and the fifth pair of incoming signals indicating the carry input from a neighboring 4-2 compressor, which are applied thereto by way of the fifth pair of input terminals CINH and CINL, respectively, and furnishes a pair of complementary output signals indicating the logical exclusive OR implementation result, as the sum of the five values: the carry input and the other four inputs, to the first and second inverter circuits 66 and 67. The first and second inverter circuits 66 and 67 then invert the pair of output signals of the fourth EXOR circuit 62 and furnish the inverted pair of outputs by way of the first pair of output terminals SOL and SOH. SOH in FIG. 9 shows the value of one of the inverted pair of outputs that is furnished by way of the output terminal SOH.

The first output of the fourth EXOR circuit 62 that appears at the connecting point between the second and third N-channel transistors 62B and 62C is the sum of the values of ones of the first through fourth pairs of incoming signals applied to the input terminals IN1H, IN2H, IN3H, and IN4H, whereas the second output of the fourth EXOR circuit 62 that appears at the connecting point between the first and fourth N-channel transistors 62A and 62D is the sum of the values of the other ones of the first through fourth pairs of incoming signals applied to the other input terminals IN1L, IN2L, IN3L, and IN4L. The second inverter circuit 67 inverts the second output of the fourth EXOR circuit 62 that appears at the connecting point between the first and fourth N-channel transistors 62A and 62D, and then furnishes the inverted result, which corresponds to the sum of the values of ones of the first through fourth pairs of incoming signals applied to the input terminals IN1H, IN2H, IN3H, and IN4H, by way of the output terminal SOH. The first inverter circuit 66 inverts the first output of the fourth EXOR circuit 62 that appears at the connecting point between the second and third N-channel transistors 62B and 62C, and then furnishes the inverted result, which corresponds to the sum of the values of the other ones of the first through fourth pairs of incoming signals applied to the other input terminals IN1L, IN2L, IN3L, and IN4L, by way of the other output terminal SOL. In other words, the first and second inverter circuits 66 and 67 substantially furnish the pair of outputs of the fourth EXOR circuit 62 by way of the first pair of output terminals SOH and SOL, just as they are. As an alternative, the first and second inverter circuits 66 and 67 can be removed if the output terminals SOL and SOH are interchanged.

In this manner, the first through fourth EXOR circuits 54, 55, 59, and 62 can calculate the sum of the five inputs: the carry input from a neighboring 4-2 compressor and the other four inputs and then furnish a pair of complementary output signals indicating the summation result by way of the first pair of output terminals SOH and SOL.

On the other hand, the first selector circuit 60 selects either the fourth pair of complementary incoming signals, which have been applied to the fourth pair of input terminals IN4H and IN4L and which are inverted or supplied thereto, just as they are, by the input value inverting circuit 51, or the pair of output signals of the first EXOR circuit 54, according to the values of the pair of output signals of the second EXOR circuit 55. The first selector circuit 60 then furnishes the selected pair of incoming signals to the third selector circuit 63. C0 shown in FIG. 9 shows the value of one of the selected pair of incoming signals that appears at one of the pair of outputs of the first selector circuit 60, which is electrically connected to the first and second N-channel transistors 60A and 60B.

The second selector circuit 61 selects either the third pair of complementary incoming signals, which have been applied to the third pair of input terminals IN4H and IN4L and which are inverted or furnished thereto, just as they are, by the input value inverting circuit 51, or a pair of signals indicating a certain value, according to the values of the pair of output signals of the second EXOR circuit 55. The second selector circuit 61 then furnishes the selected pair of signals to the third selector circuit 63. C1 shown in FIG. 9 shows the value of one of the selected pair of signals that appears at one of the pair of outputs of the second selector circuit 61, which is electrically connected to the first and second N-channel transistors 61A and 61B.

The third selector circuit 63 selects either the pair of output signals of the first selector circuit 60 or the pair of output signals of the second selector circuit 61, according to the value of the carry input indicated by the fifth pair of incoming signals applied thereto by way of the fifth pair of input terminals CINH and CINL. The third selector circuit 63 then furnishes the selected pair of incoming signals as the second carry to the third and fourth inverter circuits 68 and 69. The third and fourth inverter circuits 68 and 69 then invert the pair of output signals of the third selector circuit 63 and furnish the inverted pair of output signals by way of the second pair of output terminals COL and COH.

The first output of the third selector circuit 63 that appears at the connecting point between the third and fourth N-channel transistors 63C and 63D is the sum of the values of ones of the first through fourth pairs of incoming signals applied to the input terminals IN1H, IN2H, IN3H, and IN4H, whereas the second output of the third selector circuit 63 that appears at the connecting point between the first and second N-channel transistors 63A and 63B is the sum of the values of the other ones of the first through fourth pairs of incoming signals applied to the other input terminals IN1L, IN2L, IN3L, and IN4L. Thus, the third inverter circuit 68 can invert the second output of the third selector circuit 63 that appears at the connecting point between the first and second N-channel transistors 63A and 63B, and then furnish the inverted result, which corresponds to the sum of the values of ones of the first through fourth pairs of incoming signals applied to the input terminals IN1H, IN2H, IN3H, and IN4H, by way of the output terminal COH. Similarly, the fourth inverter circuit 69 can invert the first output of the third selector circuit 63 that appears at the connecting point between the third and fourth N-channel transistors 63C and 63D, and then furnish the inverted result, which corresponds to the sum of the values of the other ones of the first through fourth pairs of incoming signals applied to the other input terminals IN1L, IN2L, IN3L, and IN4L, by way of the other output terminal COL. In other words, the third and fourth inverter circuits 68 and 69 can substantially furnish the pair of outputs of the third selector circuit 63 by way of the second pair of output terminals COH and COL, just as they are. As an alternative, the third and fourth inverter circuits 68 and 69 can be removed if the output terminals COL and COH are interchanged.

In this manner, the first through third selector circuits 60, 61, and 63 can generate and furnish a pair of output signals indicating the second carry by way of the second pair of output terminals COH and COL.

When the carry generating circuit 57 receives the fourth pair of complementary incoming signals, which have been applied to the fourth pair of input terminals IN4H and IN4L and which are inverted or supplied thereto, just as they are, by the input value converting circuit 51, the pair of output signals of the second EXOR circuit 55, and the first and second pairs of incoming signals applied thereto by way of the first and second pairs of input terminals IN1H and IN1L, and IN2H and IN2L, it calculates a first carry from those pairs of incoming signals and then furnishes a pair of output signals indicating the first carry by way of the third pair of output terminals COTH and COTL. In other words, when the input terminal IN1H is at logic 1 and the input terminal IN2H is at logic 1, the first carry becomes logic 1. In contrast, when the input terminal IN1H is at logic 0 and the input terminal IN2H is at logic 0, the first carry becomes logic 0. Otherwise, the first carry has the same logical state as the input terminal IN4H. It is noted that the first carry is independent of the states of the third pair of input terminals IN3H and IN3L, as shown in FIG. 9. COTH of FIG. 9 shows the logical state of the output terminal COTH.

In this manner, the carry generating circuit 57 can calculate the first carry and then furnish the third pair of output signals indicating the first carry by way of the third pair of output terminals COTH and COTL.

As can be seen from the above description, the fifth embodiment of the present invention offers the same advantage as provided by the first embodiment. In addition, the 4-2 compressor circuit according to the fifth embodiment of the present invention can calculate the first logical exclusive OR EXOR1 of the third pair of inputs applied thereto by way of the third pair of input terminals IN3H and IN3L and the fourth pair of inputs applied thereto by way of the fourth pair of input terminals IN4H and IN4L, calculate the third logical exclusive OR EXOR3 of the first logical exclusive OR EXOR1 and the second logical exclusive OR EXOR2 of the first pair of inputs applied thereto by way of the first pair of input terminals IN1H and IN1L and the second pair of inputs applied thereto by way of the second pair of input terminals IN2H and IN2L, determine the values of the pair of outputs of each of the first and second selector circuits 60 and 61 according to the second exclusive OR EXOR2, furnish the logical exclusive OR of a carry input and the third exclusive OR EXOR3 as the sum of the carry input and the other four inputs, and furnish either the pair of outputs of the first selector circuit 60 or the pair of outputs of the second selector circuit 61 as a second carry according to the carry input. Accordingly, when in the order of the third pair of inputs applied to the third pair of input terminals IN3H and IN3L, the fourth pair of inputs applied to the fourth pair of input terminals IN4H and IN4L, the first and second pairs of inputs applied to the first and second pair of input terminals IN1H and IN1L, and IN2H and IN2L, and the carry input, their values are determined, the 4-2 compressor circuit according to the fifth embodiment of the present invention can perform the predetermined calculations on those pairs of incoming signals and the carry input sequentially in the order in which their values are determined. As a result, a time delay caused by variations in the time at which the values of the four inputs and the carry input are determined can be reduced and the computational speed of the 4-2 compressor circuit can be therefore improved.

In a variant of the fifth embodiment shown, a plurality of voltage separation circuits can be provided, like the third embodiment. As an alternative, a plurality of precharge circuits can be provided, like the fourth embodiment. In either case, the same advantage as provided by the third or fourth embodiment can be offered.

Sixth Embodiment

Figure 10:
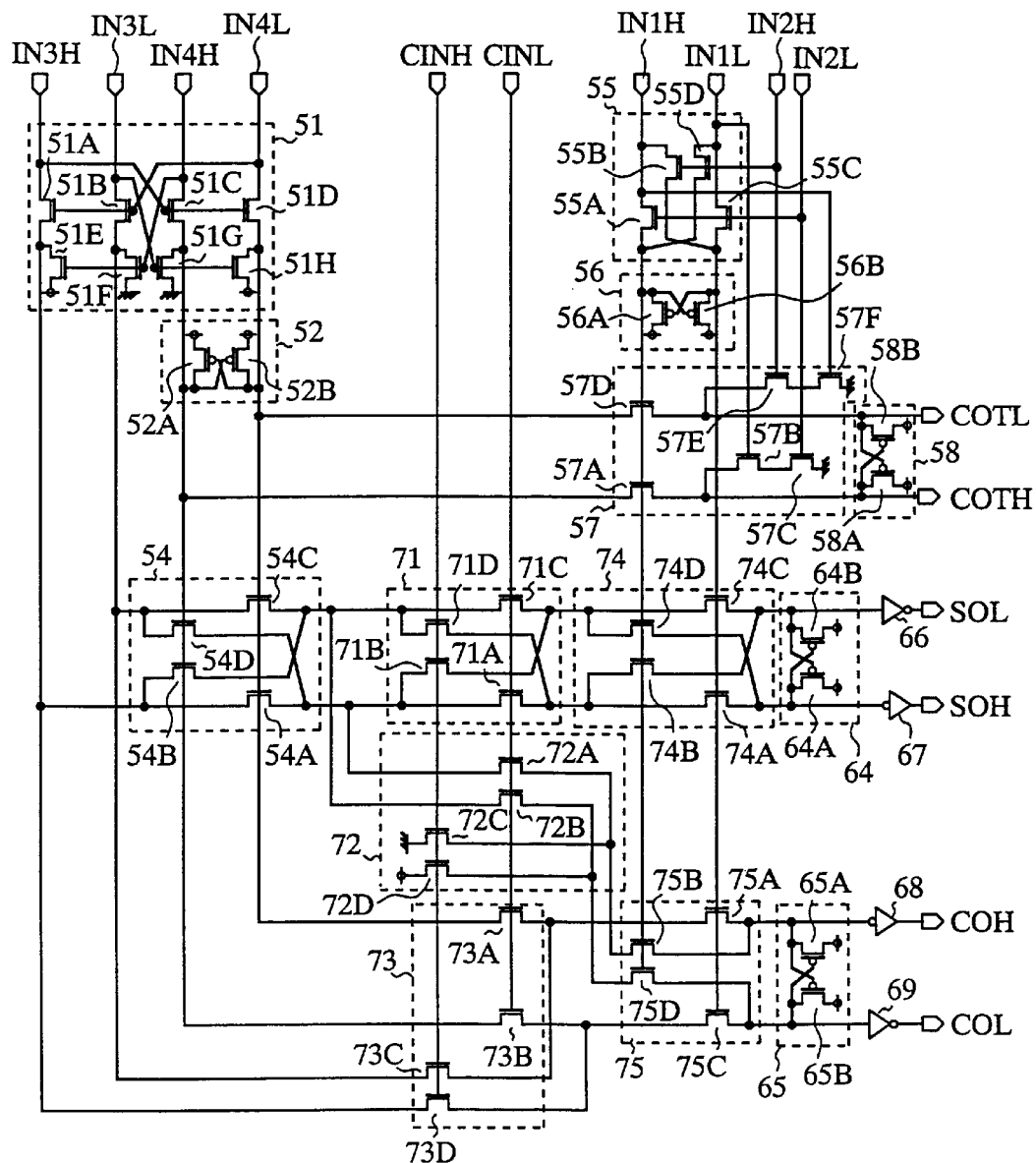
FIG. 10 is a schematic circuit diagram showing the structure of a 4-2 compressor circuit according to a sixth embodiment of the present invention.

Referring next to FIG. 10, there is illustrated a schematic circuit diagram showing the structure of a 4-2 compressor circuit according to a sixth embodiment of the present invention. In the figure, reference numeral 71 denotes a third EXOR circuit comprised of four N-channel transistors 71A to 71D, like a first EXOR circuit 54, for implementing the logical exclusive OR operation on a pair of complementary output signals of the first EXOR circuit 54 and a fifth pair of complementary incoming signals applied thereto by way of a fifth pair of input terminals CINH and CINL, indicating a carry input from a neighboring 4-2 compressor circuit, and for furnishing a pair of complementary output signals indicating the logical exclusive OR implementation result to a fourth EXOR circuit 74. The fourth EXOR circuit 74 is comprised of four N-channel transistors 74A to 74D, like the first EXOR circuit 54, for implementing the logical exclusive OR operation on the pair of complementary output signals of the third EXOR circuit 71 and the pair of complementary output signals of a second EXOR circuit 55, and for furnishing a pair of complementary output signals indicating the logical exclusive OR implementation result to first and second inverter circuits 66 and 67.

Reference numeral 72 denotes a first selector circuit comprised of four N-channel transistors 72A to 72D, like the selector circuit 5 of the above-mentioned first embodiment. The first selector circuit 72 can select either the pair of complementary output signals of the first EXOR circuit 54 or a pair of complementary signals indicating a certain value, according to the fifth pair of complementary incoming signals indicating the carry input, which are applied thereto by way of the fifth pair of input terminals CINH and CINL, and furnish the selected pair of complementary signals to a third selector circuit 75.

Reference numeral 73 denotes a second selector circuit comprised of four N-channel transistors 73A to 73D, like the first selector circuit 72. The second selector circuit 73 can select either the third pair of complementary incoming signals, which has been applied to an input value converting circuit 51 via the third pair of input terminals IN3H and IN3L and which is either inverted or furnished thereto, just as they are, by the input value converting circuit 51, or the fourth pair of complementary incoming signals, which has been applied to the input value converting circuit 51 via the fourth pair of input terminals IN4H and IN4L and which is either inverted or furnished thereto, just as they are, by the input value converting circuit 51, according to the fifth pair of complementary incoming signals indicating the carry input, which are applied thereto by way of the fifth pair of input terminals CINH and CINL, and furnish the selected pair of complementary signals to the third selector circuit 75.

The third selector circuit 75 is comprised of four N-channel transistors 75A to 75D, like the first selector circuit 72. The third selector circuit 75 can select either the pair of complementary output signals of the first selector circuit 72 or the pair of complementary output signals of the second selector circuit 73, according to the pair of complementary output signals of the second EXOR circuit 55, and furnish the selected pair of complementary signals to third and fourth inverter circuits 68 and 69.

The other components of the 4-2 compressor circuit according to the sixth embodiment of the present invention are the same as those of the 4-2 compressor circuit of the fifth embodiment mentioned above, and therefore the description of those components will be omitted hereafter.

When an input at the input terminal IN3H, which is one of the third pair of complementary incoming signals applied by way of the third pair of input terminals IN3H and IN3L, is at logic 0, and an input at the input terminal IN4H, which is one of the fourth pair of complementary incoming signals applied by way of the fourth pair of input terminals IN4H and IN4L, is at logic 1, the input value converting circuit 51 inverts the third and fourth pairs of incoming signals. The input value converting circuit 51 then furnishes the inverted values of the third pair of incoming signals applied thereto by way of the third pair of input terminals IN3H and IN3L to both the first EXOR circuit 54 and the second selector circuit 73, and the inverted values of the fourth pair of incoming signals applied thereto by way of the fourth pair of input terminals IN4H and IN4L to the first EXOR circuit 54, the carry generating circuit 57, and the second selector circuit 73. In contrast, when either the input at the input terminal IN3H is not at logic 0 or the input at the input terminal IN4H is not at logic 1, the input value converting circuit 51 furnishes the third pair of incoming signals applied thereto by way of the third pair of input terminals IN3H and IN3L to both the first EXOR circuit 54 and the second selector circuit 73, just as they are, and the fourth pair of incoming signals applied thereto by way of the fourth pair of input terminals IN4H and IN4L to the first EXOR circuit 54, the carry generating circuit 57, and the second selector circuit 73, just as they are.

When the first EXOR circuit 54 receives the third pair of complementary incoming signals, which have been applied to the third pair of input terminals IN3H and IN3L and which are inverted or supplied thereto, just as they are, by the input value converting circuit 51, and the fourth pair of complementary incoming signals, which have been applied to the fourth pair of input terminals IN3H and IN3L and which are inverted or supplied thereto, just as they are, by the input value converting circuit 51, it implements the logical exclusive OR operation on the two pairs of complementary incoming signals, respectively, and then furnishes a pair of output signals indicating the logical exclusive OR implementation result to both the third EXOR circuit 71 and the first selector circuit 72.

The second EXOR circuit 55 implements the logical exclusive OR operation on the first pair of incoming signals applied thereto by way of the first pair of input terminals IN1H and IN1L and the second pair of incoming signals applied thereto by way of the second pair of input terminals IN2H and IN2L, respectively, and then furnishes a pair of output signals indicating the logical exclusive OR implementation result to the carry generating circuit 57, the fourth EXOR circuit 74, and the third selector circuit 75.

The third EXOR circuit 71 then implements the logical exclusive OR operation on the pair of output signals of the first EXOR circuit 54 and the fifth pair of incoming signals applied thereto by way of the fifth pair of input terminals CINH and CINL, respectively, and furnishes a pair of output signals indicating the logical exclusive OR implementation result to the fourth EXOR circuit 74. After that, the fourth EXOR circuit 74 implements the logical exclusive OR operation on the pair of output signals of the third EXOR circuit 71 and the pair of output signals of the second EXOR circuit 55, respectively, and then furnishes a pair of complementary output signals indicating the logical exclusive OR implementation result, as the sum of the five values: the carry input and the other four inputs, to the first and second inverter circuits 66 and 67. The first and second inverter circuits 66 and 67 then invert the pair of output signals of the fourth EXOR circuit 74 and furnish the inverted pair of output signals by way of the first pair of output terminals SOL and SOH.

In this manner, the first through fourth EXOR circuits 54, 55, 71, and 74 can calculate the sum of the carry input and the other four inputs applied to the 4-2 compressor circuit, and then furnish a pair of complementary output signals indicating the summation result by way of the first pair of output terminals SOH and SOL.

On the other hand, the second selector circuit 73 selects either the third pair of complementary incoming signals, which have been applied to the third pair of input terminals IN3H and IN3L and which are inverted or furnished thereto, just as they are, by the input value inverting circuit 51, or the fourth pair of complementary incoming signals, which have been applied to the fourth pair of input terminals IN4H and IN4L and which are inverted or furnished thereto, just as they are, by the input value inverting circuit 51, according to the fifth pair of incoming signals indicating the carry input, which are applied thereto by way of the fifth pair of input terminals CINH and CINL. The second selector circuit 73 then furnishes the selected pair of signals to the third selector circuit 75.

The first selector circuit 72 selects either the pair of output signals of the first EXOR circuit 54 or a pair of signals indicating a certain value, according to the fifth pair of incoming signals indicating the carry input, which are applied thereto by way of the fifth pair of input terminals CINH and CINL. The first selector circuit 72 then furnishes the selected pair of incoming signals to the third selector circuit 75.

The third selector circuit 75 selects either the pair of output signals of the first selector circuit 72 or the pair of output signals of the second selector circuit 73, according to the pair of output signals of the second EXOR circuit 55. The third selector circuit 75 then furnishes the selected pair of incoming signals as a second carry to the third and fourth inverter circuits 68 and 69. The third and fourth inverter circuits 68 and 69 then invert the pair of output signals of the third selector circuit 75 and furnish the inverted pair of output signals by way of the second pair of output terminals COL and COH.

In this manner, the first through third selector circuits 72, 73, and 75 can generate and furnish a pair of output signals indicating the second carry by way of the second pair of output terminals COH and COL.

When the carry generating circuit 57 receives the fourth pair of complementary incoming signals, which have been applied to the fourth pair of input terminals IN4H and IN4L and which are inverted or supplied thereto, just as they are, by the input value converting circuit 51, the pair of output signals of the second EXOR circuit 55, and the first and second pairs of incoming signals applied thereto by way of the first and second pairs of input terminals IN1H and IN1L, and IN2H and IN2L, it calculates a first carry from those pairs of incoming signals and then furnishes a pair of output signals indicating the first carry by way of the third pair of output terminals COTH and COTL.

In this manner, the carry generating circuit 57 can calculate the first carry and then furnish the third pair of output signals indicating the first carry by way of the third pair of output terminals COTH and COTL.

The other operations of the 4-2 compressor circuit according to the sixth embodiment are the same as those of the 4-2 compressor circuit of the first embodiment mentioned above. Furthermore, the relationship between the inputs and the outputs of the 4-2 compressor circuit according to the third embodiment is the same as that of the first embodiment as shown in FIG. 2. Therefore, the description of the other operations of the 4-2 compressor circuit and the relationship between the inputs and the outputs of the 4-2 compressor circuit will be omitted hereafter.

As can be seen from the above description, the sixth embodiment of the present invention offers the same advantage as provided by the first embodiment. In addition, the 4-2 compressor circuit according to the sixth embodiment of the present invention can calculate the first logical exclusive OR EXOR1 of the third pair of inputs applied thereto by way of the third pair of input terminals IN3H and IN3L and the fourth pair of inputs applied thereto by way of the fourth pair of input terminals IN4H and IN4L, calculate the second logical exclusive OR EXOR2 of the first logical exclusive OR EXOR1 and a carry input applied thereto, determine the values of the pair of outputs of each of the first and second selector circuits 72 and 73 according to the carry input, calculate the fourth logical exclusive OR of the second logical exclusive OR EXOR2 and the third logical exclusive OR EXOR3 of the first pair of inputs applied thereto by way of the first pair of input terminals IN1H and IN1L and the second pair of inputs applied thereto by way of the second pair of input terminals IN2H and IN2L, furnish the fourth logical exclusive OR as the sum of the carry input and the other four inputs, and furnish either the pair of outputs of the first selector circuit 72 or the pair of outputs of the second selector circuit 73 as a second carry according to the third logical exclusive OR EXOR3. Accordingly, when in the order of the third pair of inputs applied to the third pair of input terminals IN3H and IN3L, the fourth pair of inputs applied to the fourth pair of input terminals IN4H and IN4L, the carry input, and the first and second pairs of inputs applied to the first and second pair of input terminals IN1H and IN1L, and IN2H and IN2L, their values are determined, the 4-2 compressor circuit according to the fifth embodiment can perform the predetermined calculations on those pairs of incoming signals and the carry input sequentially in the order in which their values are determined. As a result, a time delay caused by variations in the time at which the values of the carry input and the other four inputs are determined can be reduced, and the computational speed of the 4-2 compressor circuit can be therefore improved.

In a variant of the sixth embodiment shown, a plurality of voltage separation circuits can be provided, like the third embodiment. As an alternative, a plurality of precharge circuits can be provided, like the fourth embodiment. In either case, the same advantage as provided by the third or fourth embodiment can be offered.

Seventh Embodiment

Figure 11:
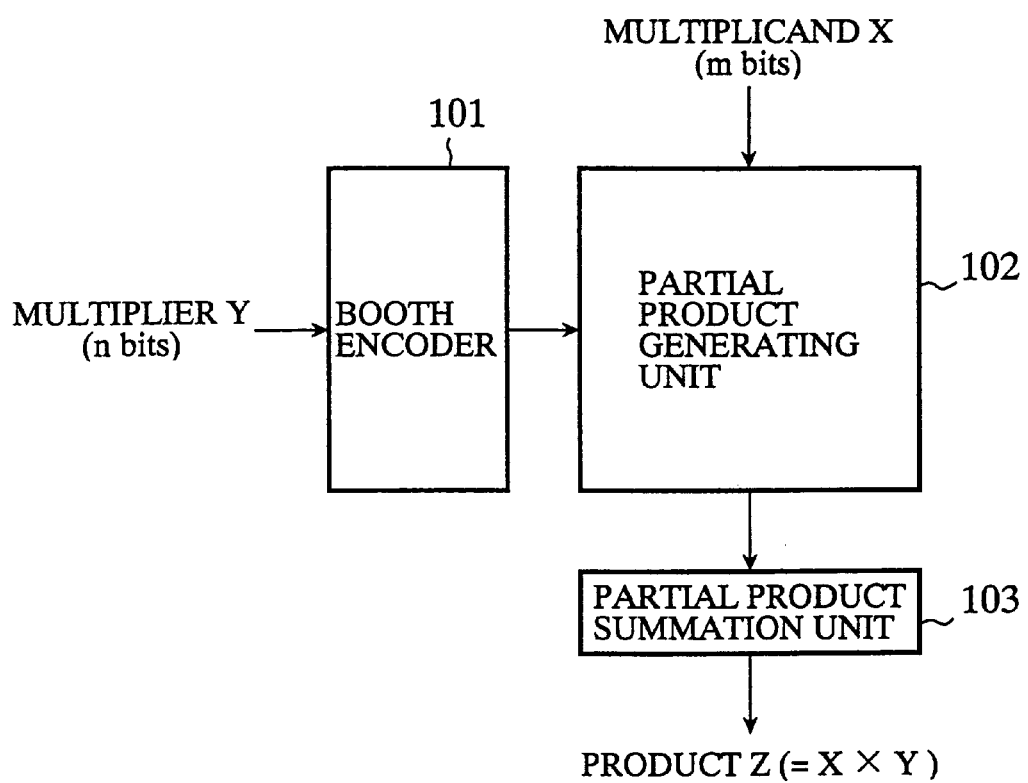
FIG. 11 is a block diagram showing the structure of a multiplier according to a seventh embodiment of the present invention.

Referring next to FIG. 11, there is illustrated a block diagram showing the structure of a multiplier according to a seventh embodiment of the present invention. The multiplier according to the seventh embodiment can comprise a plurality of 4-2 compressor circuits according any one of the first through sixth embodiments mentioned above of the present invention.

In FIG. 11, reference numeral 101 denotes a booth encoder for booth-encoding each of a plurality of sets of three neighboring bits of an n-bit multiplier Y applied thereto, and for furnishing a plurality of booth-encoded output signals to a partial product generating unit 102. For example, when the booth encoder 101 performs an encoding operation on the n-bit multiplier Y according to a second-order booth algorithm, it generates ($[n/2]+1$) booth-encoded output signals, where the pair of brackets [] show Gauss's notation. When the partial product generating unit 102 receives the plurality of booth-encoded output signals from the booth encoder 101 as well as an m-bit multiplicand X, it generates a partial product and a carry output from the plurality of booth-encoded signals by shifting the multiplicand X by means of a shifter, and then furnishes the partial product and the carry output to a partial product summation unit 103 for calculating the sum of the partial product and the carry output, and then furnishing a product Z of the multiplicand X and the multiplier Y, i.e. X*Y.

Figure 12:
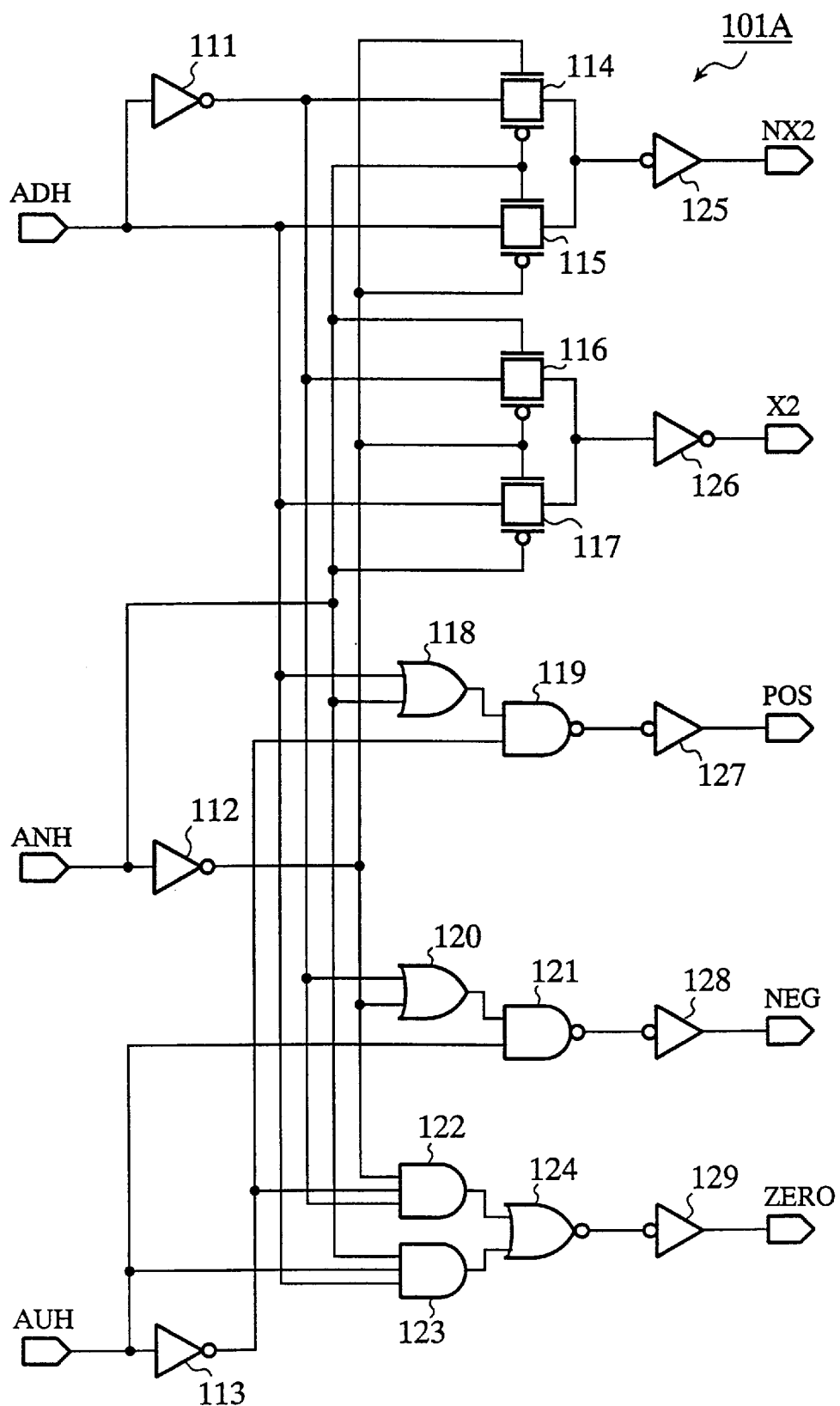
FIG. 12 is a schematic circuit diagram showing an example of a booth encoder disposed for every neighboring three bits of a multiplier Y applied to a booth encoder.

Referring next to FIG. 12, there is illustrated a schematic circuit diagram showing an example of a booth encoder 101A disposed for booth-encoding each of a plurality of sets of neighboring three bits of the n-bit multiplier Y applied to the booth encoder 101. The booth encoder 101A is intended to booth encode the i-th bit of the multiplier Y. The booth encoder 101A includes a first inverter circuit 111 for inverting the (i−1)-th bit of the multiplier Y applied thereto by way of an input terminal ADH, and for furnishing the inverted bit to two transmission gates 114 and 116, an OR gate 120, and an AND gate 122; a second inverter circuit 112 for inverting the i-th bit of the multiplier Y applied thereto by way of an input terminal ANH, and for furnishing the inverted bit to the two transmission gates 114 and 116, two other transmission gates 115 and 117, the OR gate 120, and the AND gate 122; and a third inverter circuit 113 for inverting the (i+1)-th bit of the multiplier Y applied thereto by way of an input terminal AUH, and for furnishing the inverted bit to a NAND gate 119 and the AND gate 122. The (i−1)-th bit of the multiplier Y is the bit that lies in a lower position than the i-th bit of the multiplier Y by one bit. The (i+1)-th bit of the multiplier Y is the bit that lies in a higher position than the i-th bit of the multiplier Y by one bit.

When the i-th bit of the multiplier Y applied to the input terminal ANH is zero, the transmission gate 114 is switched on and furnishes the inverted value of the (i−1)-th bit of the multiplier Y, which is obtained by the first inverter circuit 111, to an inverter circuit 125. In contrast, when the i-th bit of the multiplier Y applied to the input terminal ANH is one, the transmission gate 114 is switched off. When the i-th bit of the multiplier Y applied to the input terminal ANH is one, the second transmission gate 115 is switched on and furnishes the (i−1)-th bit of the multiplier Y, which is applied thereto by way of the input terminal ADH, to the inverter circuit 125. In contrast, when the i-th bit of the multiplier Y applied to the input terminal ANH is zero, the second transmission gate 115 is switched off.

When the i-th bit of the multiplier Y applied to the input terminal ANH is one, the third transmission gate 116 is switched on and furnishes the inverted value of the (i−1)-th bit of the multiplier Y, which is obtained by the first inverter circuit 111, to an inverter circuit 126. In contrast, when the i-th bit of the multiplier Y applied to the input terminal ANH is zero, the third transmission gate 116 is switched off. When the i-th bit of the multiplier Y applied to the input terminal ANH is zero, the fourth transmission gate 117 is switched on and furnishes the (i−1)-th bit of the multiplier Y, which is applied thereto by way of the input terminal ADH, to the inverter circuit 126. In contrast, when the i-th bit of the multiplier Y applied to the input terminal ANH is one, the fourth transmission gate 117 is switched off.

In FIG. 12, reference numeral 118 denotes an OR gate for implementing the logical OR operation on the (i−1)-th bit of the multiplier Y applied thereto by way of the input terminal ADH and the i-th bit of the multiplier Y applied thereto by way of the input terminal ANH, and for furnishing the logical OR implementation result to the NAND gate 119. The NAND gate 119 can implement the logical NAND operation on the inverted value of the (i+1)-th bit of the multiplier Y applied thereto by way of the input terminal AUH, which is obtained by the inverter circuit 113, and the output of the OR gate 118, and for furnishing the logical NAND implementation result to an inverter circuit 127.

The OR gate 120 can implement the logical OR operation on the inverted value of the (i−1)-th bit of the multiplier Y applied to the input terminal ADH, which is obtained by the first inverter circuit 111, and the inverted value of the i-th bit of the multiplier Y applied to the input terminal ANH, which is obtained by the second inverter circuit 112, and then furnishes the logical OR implementation result to a NAND gate 121. The NAND gate 121 can implement the logical NAND operation on the (i+1)-th bit of the multiplier Y applied thereto by way of the input terminal AUH and the output of the OR gate 120, and then furnishes the logical NAND implementation result to an inverter circuit 128.

The AND gate 122 implements the logical AND operation on the inverted value of the (i−1)-th bit of the multiplier Y applied to the input terminal ADH, which is obtained by the first inverter circuit 111, the inverted value of the i-th bit of the multiplier Y applied to the input terminal ANH, which is obtained by the second inverter circuit 112, and the inverted value of the (i+1)-bit of the multiplier Y applied to the input terminal AUH, which is obtained by the third inverter circuit 113, and then furnishes the logical AND implementation result to a NOR gate 124. An AND gate 123 can implement the logical AND operation on the (i−1)-th bit of the multiplier Y applied to the input terminal ADH, the i-th bit of the multiplier Y applied to the input terminal ANH, and the (i+1)-bit of the multiplier Y applied to the input terminal AUH, and then furnishes the logical AND implementation result to the NOR gate 124. The NOR gate 124 can implement the logical NOT operation on the logical OR of the output of the AND gate 122 and the output of the AND gate 123, and then furnish the inverted value of the logical OR of the two inputs to an inverter circuit 129.

The inverter circuit 126 inverts either the inverted value of the (i−1)-th bit of the multiplier Y applied thereto by way of the third transmission gate 116 or the (i−1)-th bit of the multiplier Y applied thereto by way of the third transmission gate 117, and then furnishes, by way of an output terminal X2, the inverted result indicating whether or not each bit of the multiplicand X is to be shifted by one bit in an upward direction when generating a partial product of the booth-encoded signal corresponding to the i-th bit of the multiplier Y and the multiplicand X. The inverter circuit 125 inverts either the inverted value of the (i−1)-th bit of the multiplier Y applied thereto by way of the first transmission gate 114 or the (i−1)-th bit of the multiplier Y applied thereto by way of the second transmission gate 115, and then furnishes the inverted result having a value complementary to the output of the inverter circuit 126 by way of an output terminal NX2.

The inverter circuit 128 inverts the output of the NAND gate 121, and then furnishes, by way of an output terminal NEG, the inverted result indicating whether or not each bit of the multiplicand X is to be inverted when generating a partial product of the booth-encoded output signal corresponding to the i-th bit of the multiplier Y and the multiplicand X. The inverter circuit 127 inverts the output of the NAND gate 119, and then furnishes the inverted result having a value complementary to the output of the inverter circuit 128 by way of an output terminal POS.

The inverter circuit 129 inverts the output of the NOR gate 124, and then furnishes, by way of an output terminal ZERO, the inverted result indicating whether or not each bit of the multiplicand X is to be set to zero when generating a partial product of the booth-encoded output signal corresponding to the i-th bit of the multiplier Y and the multiplicand X.

Figure 13:
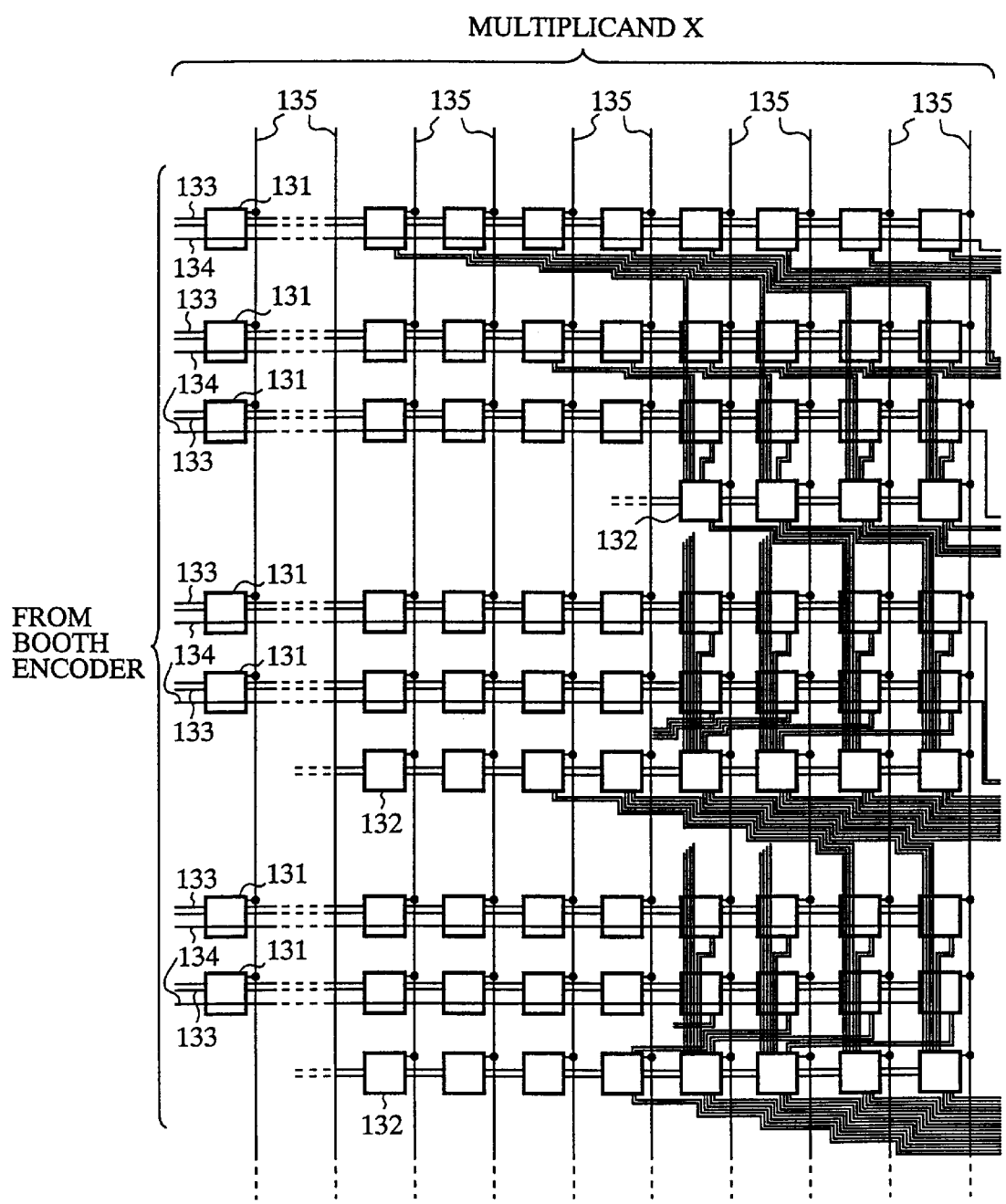
FIG. 13 is a block diagram showing the structure of an example of a partial product generating unit of the multiplier according to the seventh embodiment of the present invention.

Referring next to FIG. 13, there is illustrated a block diagram showing the structure of an example of the partial product generating unit 102 of the multiplier according to the seventh embodiment of the present invention. In the figure, reference numeral 131 denotes a booth shifter that receives the booth-encoded output signal from the booth encoder 101, which corresponds to the i-th bit of the multiplier Y, by way of a signal line 134, the j-th bit of the multiplicand X by way of a signal line 135, and a pair of complementary signals respectively having the inverted value and original value of a neighboring lower bit of the multiplicand X, which are generated and furnished thereto by another booth shifter 131 associated with a neighboring lower bit of the multiplicand X, by way of a pair of signal lines 133. The partial product generating unit 102 includes a plurality of booth shifters 131 arranged in the form of an array, per each of the n bits of the multiplier Y, the number of booth shifters 131 aligned in each row being equal to the number of bits of the multiplicand. In FIG. 13, the signal line 134 is illustrated as a single line, for simplicity. In fact, the signal line 134 is comprised of five lines, by way of which five encoded signals can be transmitted.

In FIG. 13, reference numeral 132 denotes each of a plurality of 4-2 compressor circuits according any one of the first through sixth embodiments mentioned above. The plurality of 4-2 compressor circuits 132 are arranged in the form of an array, each of them being associated with each of the plurality of booth shifters 131. Each 4-2 compressor circuit 132 can receive first and second pairs of incoming signals from a neighboring 4-2 compressor 132 associated with a neighboring lower bit of the multiplier Y by way of first and second pairs of input terminals IN1H and IN1L, and IN2H and IN2L, third and fourth pairs of incoming signals from a corresponding booth shifter 131 by way of third and fourth pairs of input terminals IN3H and IN3L, and IN4H and IN4L, and a carry input from a neighboring 4-2 compressor 132 associated with a neighboring lower bit of the multiplicand X by way of a fifth pair of input terminals CINH and CINL. Each 4-2 compressor circuit 132 then calculates the sum of the five inputs and furnishes a first pair of output signals indicating the summation result by way of a first pair of output terminals SOH and SOL, and a second pair of output signals indicating a second carry generated during the calculation of the summation by way of a second pair of output terminals COH and COL. Each 4-2 compressor circuit 132 also furnishes a third pair of output signals indicating a first carry generated during the calculation of the summation to a neighboring 4-2 compressor circuit associated with a higher bit of the multiplicand X by way of a third pair of output terminals COTH and COTL.

Figure 14:
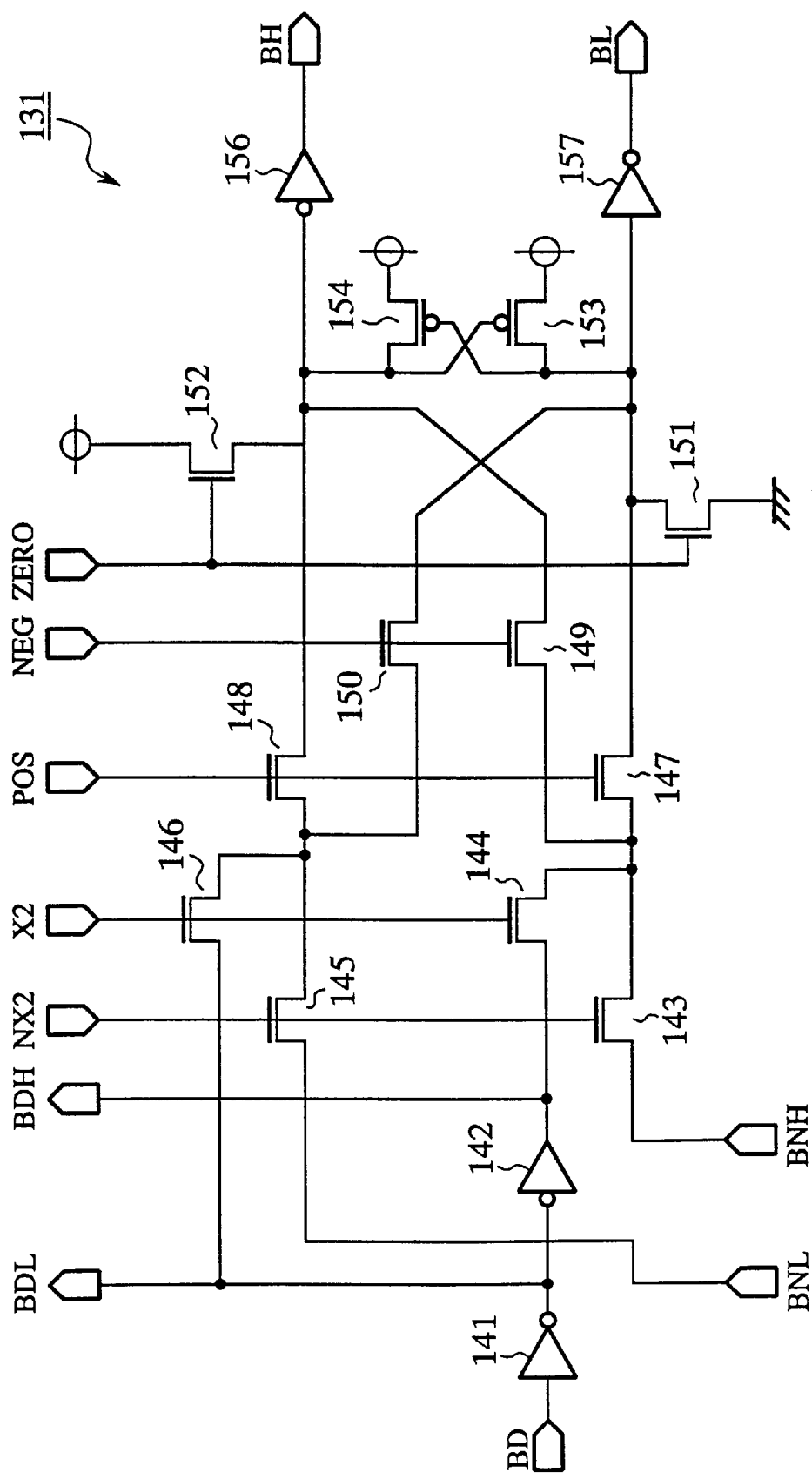
FIG. 14 is a schematic circuit diagram showing the structure of an example of each of a plurality of booth shifters included in the partial product generating unit of FIG. 13.
Figure 15:
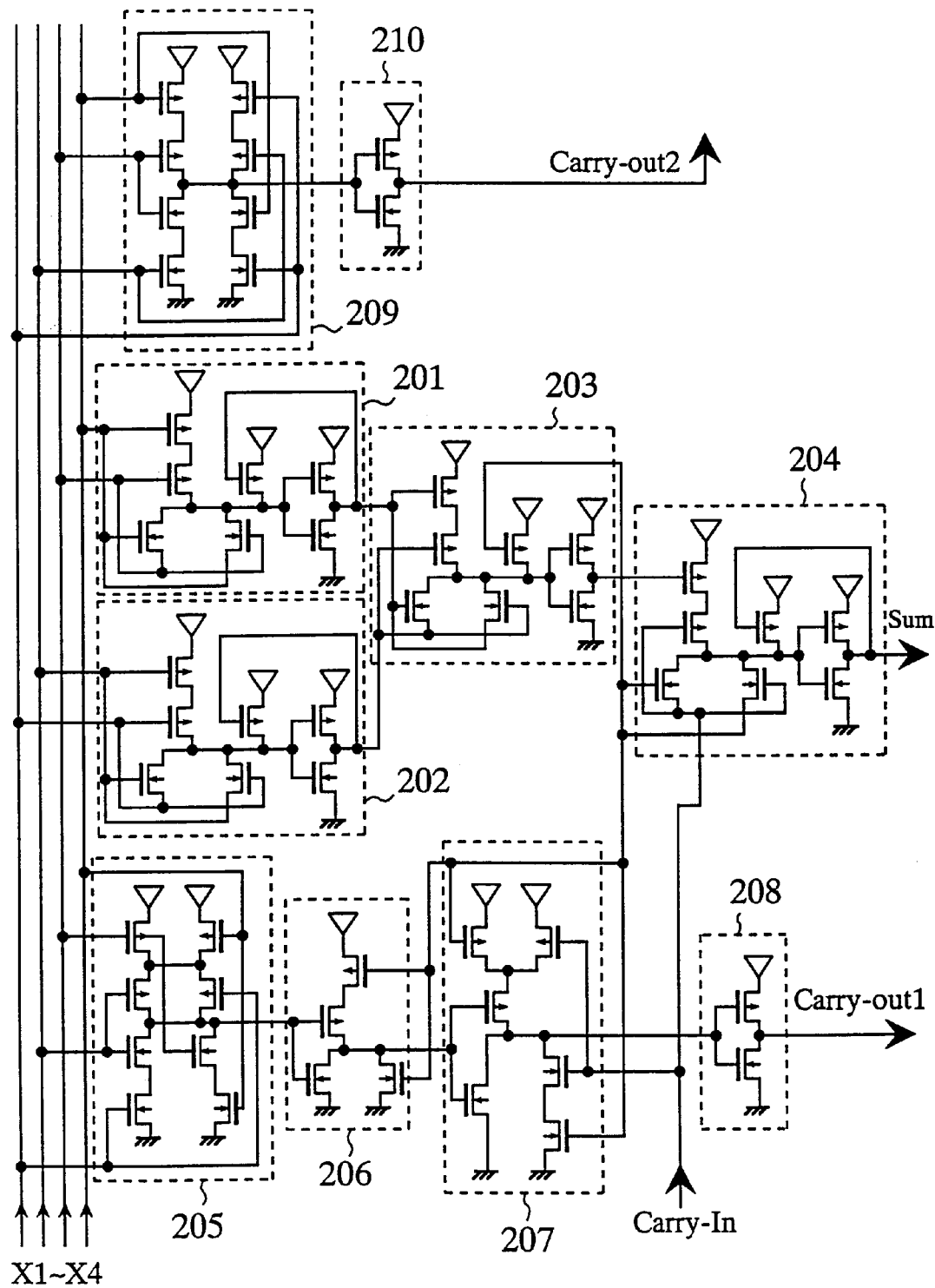
FIG. 15 is a schematic circuit diagram showing the structure of a prior art 4-2 compressor circuit.

Referring next to FIG. 14, there is illustrated a schematic circuit diagram showing the structure of an example of each of the plurality of booth shifters 131 included in the partial product generating unit 102 of FIG. 13. In FIG. 14, reference numeral 141 denotes an inverter circuit for inverting the j-th bit of the multiplicand X applied thereto by way of an input terminal BD, and for furnishing the inverted value to a second inverter circuit 142 and a fourth N-channel transistor 146 as well as to a booth shifter 131 associated with a higher bit of the multiplicand X by way of an output terminal BDL. The second inverter circuit 142 can invert the output of the first inverter circuit 141 and then furnish the inverted value, i.e. the j-th bit of the multiplicand X, to a second N-channel transistor 144 as well as to the booth shifter 131 associated with a higher bit of the multiplicand X by way of an output terminal BDH.

A selector circuit, which is comprised of a first N-channel transistor 143, the second N-channel transistor 144, a third N-channel transistor 145, and the fourth N-channel transistor 146, can select either a pair of incoming signals indicating the (j−1)-th bit of the multiplicand X, which are applied thereto by way of a pair of input terminals BNH and BNL electrically connected to the output terminals BDH and BDL of a corresponding booth shifter 131 associated with a lower bit of the multiplicand X, or the pair of outputs of the inverter circuits 141 and 142 indicating the j-th bit of the multiplicand X, according to a pair of incoming signals applied thereto by way of a pair of input terminals X2 and NX2 respectively electrically connected to the output terminals X2 and NX2 of a corresponding encoder circuit 101A of the booth encoder 101.

Fifth through eighth N-channel transistors 147 to 150 construct an EXOR circuit for inverting the output of the selector circuit comprised of the first through fourth N-channel transistors 143 to 146 according to a pair of incoming signals applied thereto by way of a pair of input terminals NEG and POS respectively electrically connected to the output terminals NEG and POS of the corresponding encoder circuit 101A of the booth encoder 101.

A ninth N-channel transistor 151 can forcedly set the logical state of an output of the booth shifter 131 to be furnished by way of an output terminal BL to logic 0 according to a signal applied thereto by way of an input terminal ZERO electrically connected to the output terminal ZERO of the corresponding encoder circuit 101A of the booth encoder 101. Similarly, a tenth N-channel transistor 151 can forcedly set the logical state of another output of the booth shifter 131 to be furnished by way of another output terminal BH to logic 1 according to the signal applied thereto by way of the input terminal ZERO electrically connected to the output terminal ZERO of the corresponding encoder circuit 101A of the booth encoder 101.

Two P-channel transistors 153 and 154 construct a voltage compensation circuit. A pair of two inverter circuits 156 and 157 invert the pair of complementary outputs of the EXOR circuit comprised of the fifth through eighth N-channel transistors 147 to 150 and then furnish the inverted pair of complementary outputs to the next 4-2 compressor circuit 132 associated with a few rows of booth shifters intended for processing a booth-encoded signal corresponding to a higher bit of the multiplier Y by way of the pair of output terminals BH and BL.

When the booth encoder 101 receives an n-bit multiplier Y, it performs the booth encoding operation on the multiplier Y, and then generates and furnishes a booth-encoded output signal for each of a plurality of sets of neighboring three bits of the multiplier Y to a plurality of booth shifters 131 included in the partial product generating unit 102.

When the partial product generating unit 102 receives a multiplier X, one booth shifter 131 associated with the j-th bit of the multiplicand X can perform an operation on the j-th bit of the multiplicand X: shifts the j-th bit of the multiplicand in an upward direction by one bit, inverts the j-th bit of the multiplicand, sets the value of the j-th bit of the multiplicand to zero, or shifts the j-th bit of the multiplicand in an upward direction by one bit and inverts the shifted bit, according to the booth-encoded signal applied thereto from the booth encoder 101, so as to generate and furnish a partial product to a corresponding 4-2 compressor circuit 132.

Each 4-2 compressor circuit 132 can calculate the sum of two inputs from a corresponding booth shifter 131 and two other inputs from a neighboring 4-2 compressor circuit 132 corresponding to a lower bit of the multiplier Y, and furnish the summation result to the next 4-2 compressor circuit 132 corresponding to a higher bit of the multiplier Y.

In this manner, each pair of one booth shifter 131 and a corresponding 4-2 compressor circuit 132 included in the partial product generating unit 102 can generate a partial product in turn, and a 4-2 compressor circuit 132 at the final stage of the partial product generating unit 102 can furnish its output to the partial product summation unit 103. In one 4-2 compressor circuit, the values of two incoming signals from a corresponding booth shifter 131 are determined before the determination of the values of two other incoming signals from the preceding 4-2 compressor circuit 132, from the viewpoint of the structure of the 4-2 compressor circuit.

Then the partial production summation unit 103 calculates and furnishes the product of the multiplicand and the multiplier by calculating the sum of the summation result from the 4-2 compressor circuit at the final stage of the partial product generating unit 102 and the second carry from a lower bit of the multiplicand X.

As previously mentioned, in accordance with the seventh embodiment of the present invention, there is provided a multiplier including a plurality of 4-2 compressor circuits according to any one of the first through sixth embodiments mentioned above. Accordingly, the seventh embodiment can offer an advantage of being able to implement a multiplier whose computational speed is improved. The structure of the multiplier according to the present invention is not limited to that of the multiplier of the seventh embodiment shown.

Many widely different embodiments of the present invention may be constructed without departing from the spirit and scope of the present invention. It should be understood that the present invention is not limited to the specific embodiments described in the specification, except as defined in the appended claims.

What is claimed is:

1. A 4-2 compressor circuit for calculating the sum of first through fourth inputs and a carry input applied thereto and for furnishing the summation result and first and second carries generated during said calculation of the sum, said 4-2 compressor circuit comprising:

input value inverting means for inverting said third and fourth inputs only if the third input is logic 0 and the fourth input is logic 1;

summation means for calculating the logical exclusive OR of any two of said first through fourth inputs and said carry input applied to said 4-2 compressor, the logical exclusive OR of any two of the first logical exclusive OR and the remaining three inputs, the logical exclusive OR of any two of the second logical exclusive OR and the remainder, and the logical exclusive OR of the third logical exclusive OR and the remainder, and for furnishing the fourth logical exclusive OR as said summation result;

carry calculating means for calculating said first carry from said first, third, and fourth inputs, and for furnishing said first carry; and selecting means for selecting either said carry input or said second input according to the logical exclusive OR of the logical exclusive OR of any two of said first through fourth inputs and the logical exclusive OR of the remainder, and for furnishing the selected one as said second carry.

2. The 4-2 compressor circuit according to claim 1, wherein said 4-2 compressor circuit receives first through fifth pairs of complementary incoming signals respectively indicating said first through fourth inputs and said carry input, and furnishes first through third pairs of complementary output signals respectively indicating said summation result, and said first and second carries, wherein said summation means includes a first calculation circuit for calculating the logical exclusive OR of any two of said first through fourth inputs, a second calculation circuit for calculating the logical exclusive OR of the remainder, a third calculation circuit for calculating the logical exclusive OR of the logical exclusive OR calculation results made by said first and second calculation circuits, and a fourth calculation circuit for calculating the logical exclusive OR of the logical exclusive OR calculation result made by said third calculation circuit and said carry input, each of said first through fourth calculation circuits implementing the logical exclusive OR operation on a first pair of complementary incoming variables applied thereto by way of first and second signal lines and a second pair of complementary incoming variables applied thereto by way of third and fourth signal lines, respectively, furnishing a pair of complementary output signals indicating the logical exclusive OR implementation result by way of fifth and sixth signal lines, and including a first N-channel transistor having a gate terminal electrically connected to said first signal line, a second terminal electrically connected to said third signal line, and a third terminal electrically connected to said fifth signal line, a second N-channel transistor having a gate terminal electrically connected to said second signal line, a second terminal electrically connected to said third signal line, and a third terminal electrically connected to said sixth signal line, a third N-channel transistor having a gate terminal electrically connected to said first signal line, a second terminal electrically connected to said fourth signal line, and a third terminal electrically connected to said sixth signal line, and a fourth N-channel transistor having a gate terminal electrically connected to said second signal line, a second terminal electrically connected to said fourth signal line, and a third terminal electrically connected to said fifth signal line, and wherein said selecting means includes a first N-channel transistor having a gate terminal electrically connected to the third terminals of said first and fourth N-channel transistors of said third calculation circuit, a second terminal electrically connected to an input signal line for receiving one of said second pair of incoming signals, and a third terminal electrically connected to an output signal line for furnishing one of said third pair of output signals indicating said second carry, a second N-channel transistor having a gate terminal electrically connected to the third terminals of said second and third N-channel transistors of said third calculation circuit, a second terminal electrically connected to an input signal line for receiving one of said fifth pair of incoming signals indicating said carry input, and a third terminal electrically connected to the output signal line for furnishing one of said pair of output signals indicating said second carry, a third N-channel transistor having a gate terminal electrically connected to the third terminals of said first and fourth N-channel transistors of said third calculation circuit, a second terminal electrically connected to an input signal line for receiving the other one of said second pair of incoming signals, and a third terminal electrically connected to an output signal line for furnishing the other one of said third pair of output signals indicating said second carry, and a fourth N-channel transistor having a gate terminal electrically connected to the third terminals of said second and third N-channel transistors of said third calculation circuit, a second terminal electrically connected to an input signal line for receiving the other one of said fifth pair of incoming signals indicating said carry input, and a third terminal electrically connected to the output signal line for furnishing the other one of said third pair of output signals indicating said second carry.

3. The 4-2 compressor circuit according to claim 2, wherein when said first carry calculated has a predetermined value, said carry calculation means furnishes an output having a value of ground as said first carry; otherwise, said carry calculation means furnishes, as said first carry, an output having a value corresponding to a difference between a power supply voltage and a threshold voltage between the gate and source terminals of an N-channel transistor.

4. The 4-2 compressor circuit according to claim 2, further comprising voltage holding means for pulling up a higher-voltage one of said first and second signal lines of said fourth calculation circuit to a power supply voltage, and for holding a higher-voltage one of said pair of input signal lines of said selecting means, for receiving said fifth pair of incoming signals indicating said carry input, which are electrically connected to the second terminals of said second and fourth N-channel transistors of said selecting means, respectively, at a voltage corresponding to a difference between the power supply voltage and a threshold voltage between the gate and source terminals of an N-channel transistor.

5. The 4-2 compressor circuit according to claim 2, further comprising voltage holding means for pulling up a higher-voltage one of a signal line electrically connected to the gate terminals of said first and third N-channel transistors of said selecting means and another signal line electrically connected to the gate terminals of said second and fourth N-channel transistors of said selecting means to a power supply voltage, and for holding a higher-voltage one of said third and fourth signal lines of said fourth calculation circuit at a voltage corresponding to a difference between the power supply voltage and a threshold voltage between the gate and source terminals of an N-channel transistor.

6. The 4-2 compressor circuit according to claim 2, further comprising a plurality of precharge means each for precharging a pair of outputs or inputs of each of first through fourth calculation circuits and said selecting means so that they have a power supply voltage.

7. A 4-2 compressor circuit for calculating the sum of first through fourth inputs and a carry input applied thereto and for furnishing the summation result and first and second carries generated during said calculation of the sum, said 4-2 compressor circuit comprising:

input value inverting means for inverting the third and fourth inputs only if the third input is logic 0 and the fourth input is logic 1;

summation means for calculating the logical exclusive OR of said first and second inputs, the logical exclusive OR of said third and fourth inputs, the logical exclusive OR of the first logical exclusive OR and the second logical exclusive OR, and the logical exclusive OR of the third logical exclusive OR and said carry input, and for furnishing the fourth logical exclusive OR as said summation result;

carry calculating means for calculating said first carry from said first, second, and fourth inputs, and for furnishing said first carry;

first selecting means for selecting either said fourth input or said second logical exclusive OR of said third and fourth inputs, according to the first logical exclusive OR of said first and second inputs, and for furnishing the selected one as its output;

second selecting means for selecting either said third input or a predetermined value, according to the first logical exclusive OR of said first and second inputs, and for furnishing the selected one as its output; and third selecting means for selecting either the output of said first selecting means or the output of said second selecting means, according to said carry input, and for furnishing the selected one as said second carry.

8. A 4-2 compressor circuit for calculating the sum of first through fourth inputs and a carry input applied thereto and for furnishing the summation result and first and second carries generated during said calculation of the sum, said 4-2 compressor circuit comprising:

input value inverting means for inverting the third and fourth inputs only if the third input is logic 0 and the fourth input is logic 1;

summation means for calculating the logical exclusive OR of said third and fourth inputs, the logical exclusive OR of said first logical exclusive OR and said carry input, the logical exclusive OR of said first and second inputs, and the logical exclusive OR of the second logical exclusive OR and the third logical exclusive OR, and for furnishing the fourth logical exclusive OR as said summation result;

carry calculating means for calculating said first carry from said first, second, and fourth inputs, and for furnishing said first carry;

first selecting means for selecting either said first logical exclusive OR of said third and fourth inputs or a predetermined value, according to said carry input, and for furnishing the selected one as its output;

second selecting means for selecting either said third input or said fourth input, according to said carry input, and for furnishing the selected one as its output; and third selecting means for selecting either the output of said first selecting means or the output of said second selecting means, according to said third logical exclusive OR of said first and second inputs, and for furnishing the selected one as said second carry.

9. A 4-2 compressor circuit comprising:

means for receiving first through fifth pairs of complementary incoming signals respectively indicating first through fourth inputs and a carry input;

means for calculating a sum of said first through fourth inputs and said carry input;

means for outputting first through third pairs of complementary output signals respectively indicating said summation result, and first and second carries; and a voltage holding circuit including means for pulling up a higher-voltage one of a pair of complementary signals to a power supply voltage, and for furnishing the signal that has been pulled up; and means for also holding the higher-voltage signal at a predetermined voltage corresponding to a difference between the power supply voltage and a threshold voltage between the gate and source terminals of an N-channel transistor, and for furnishing the signal held at the predetermined voltage.

* * * * *